United States Patent Office 3,579,515
Patented May 18, 1971

3,579,515
MOLECULAR COMPLEXES OF CYCLIC CARBAMATE POLYMERS WITH PHENOLS AND THIOPHENOLS
Wilhelm E. Walles, Midland, Mich., assignor to The Dow Chemical Company, Midland, Mich.
No Drawing. Continuation-in-part of application Ser. No. 573,488, Aug. 19, 1966, which is a continuation-in-part of application Ser. No. 12,254, Mar. 2, 1960. This application Feb. 4, 1969, Ser. No. 796,592
Int. Cl. C08f 7/12
U.S. Cl. 260—244                                1 Claim

ABSTRACT OF THE DISCLOSURE

Stable complexes of phenols or thiophenols with cyclic carbamate polymers such as poly(vinyl oxazolidinone).

---

This application is a continuation-in-part of application Ser. No. 573,488, filed Aug. 19, 1966, now Pat. No. 3,449,339, which was a continuation-in-part of application Ser. No. 12,254, filed Mar. 2, 1960, and now abandoned.

According to the present invention I have invented certain novel complexes possessing remarkable stability. All the present complexes have, in common, the property that each of them comprises, as one member of the complex, a cyclic carbamate compound, and as the other member another organic compound comprising at least a cation, that is to say, an electropositive moiety, and a negative organic radical.

The known noun *complex* is used herein in strict accord with one of its known meanings, to designate, in a generic or specific sense, a composition of matter such as those of the present invention; a substance composed of separate molecules bonded together by forces not so strong as conventional covalent bonds but stronger than hydrogen bonding, and strong enough that not only are the present complexes stable under ordinary conditions of preparation, storage, and employment, but also they confer stability on the behaviour of their members.

The bonding of the present complexes arises when candidate substances to become members of the complex are brought into contact one with another, and occurs without addition to or subtraction from any compound of any atom.

The noun *complectant* is used generically to designate a molecular chemical substance which may be caused to unite with a compound comprising a cationic, that is to say, an electropositive moiety and a negative organic group in preparation of the present complexes. The complectant is, in general, the material whose properties have been observed to have the greater effect (of the effects of at least two kinds of components of the resulting complex) upon the solubility, stability, physical state, and many other physical properties of the said complex, and is common to many different kinds of complex. All the present complectants are cyclic carbamate compounds.

The noun *complectate* is used in the present specification and claims to designate an organic chemical substance other than the complectant, a molecule of which comprises at least a cation, that is to say a positive moiety, and a negative group, which unites with the complectant in the preparation of the present complexes; the complectate is the material whose properties have frequently been observed to have the greater effect (of the effects of the two kinds of members of the resulting complex) upon many chemical and particularly biochemical properties of the complex. The properties of complectates are dependably stabilized. Volatility, if any, is suppressed. Toxicity is reduced. Routine chemical reactivity is not affected.

In view of these definitions, the present invention relates to novel complexes of which the complectants are cyclic carbamate compounds of which oxazolidinone and oxazinidinone are representative, and designated by the formula

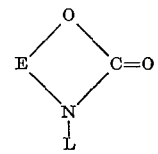

wherein O is the symbol for oxygen, C is the symbol for carbon, N is the symbol for nitrogen, the foregoing being conventional symbols, and wherein E represents a divalent group which, in every occurrence, introduces either two or three carbon atoms at the indicated heterocyclic ring site between nitrogen and oxygen, and may be substituted with hydroxyl, alkyl of up to 30 carbon atoms, hydroxyalkyl, phenyl, phenylalkyl, alkylphenyl, haloalkyl, halophenyl, halophenylalkyl, cycloalkyl of 5 to 6, both inclusive, carbon atoms, alpha-naphthyl, and beta naphthyl. As representative of the moiety E there can be ethylene (dimethylene), hydroxyethylene, trimethylene, methylethylene (isopropylene), hydroxymethylene, 1,2-dimethylethylene (2,3-n-butylene), 1,3-amylene, 2,3-amylene, 2,4-amylene, 1,2-hexylene, 2,4-hexylene, 2,3-hexylene, 3,4-hexylene;

cyclohexyl ethylene,
3-cyclohexyl-1,2-propylene,
1-cyclohexyl-1,2-butylene,
1-cyclohexyl-1,3-butylene,
1-cyclohexyl-2,3-butylene,
2-cyclohexyl-1,2-butylene,
2-cyclohexyl-1,3-butylene,
cyclobutylene,
3-cyclobutyl-1,2-propylene,
1-cyclobutyl-1,2-butylene,
1-cyclobutyl-1,3-butylene,
1-cyclobutyl-2,3-butylene,
2-cyclobutyl-1,2-butylene,
2-cyclobutyl-1,3-butylene;
phenylethylene,
1-phenyl-1,3-propylene,
1-phenyl-1,2-propylene,
1,3-diphenyl-1,2-propylene,
2-phenyl-1,3-propylene,
(1-p-chlorophenyl)trimethylene,
2(2,4,5-trichlorophenyl)-3,4-hexylene,
1-(p-chlorophenyl)trimethylene,
1-(p-fluorophenyl)trimethylene,
1-(p-bromophenyl)trimethylene,
1-(p-iodophenyl)trimethylene,
2-(2,4,5-trichlorophenyl)-3,4-hexamethylene,
2-(2,4,5-trifluorophenyl)-3,4-hexamethylene,
2-(2,4,5-tribromophenyl)-3,4-hexamethylene,
2-(2,4,5-triiodophenyl)-3,4-hexamethylene,
(p-tolyl)ethylene,
2-(o-tolyl)-1,3-trimethylene,
alphanaphthylethylene,
1-β-naphthyl-1,3-trimethylene,
1,2-phenylene,
4-chloro-1,2-phenylene,
4-fluoro-1,2-phenylene,
4-bromo-1,2-phenylene, and
4-iodo-1,2-phenylene.

In the above type formula, the symbol L can be substantially any structure that bonds stably with the nitrogen. In its simplest form, L is hydrogen.

L is also alkyl of from 1 to 30, both inclusive, carbon atoms, and in particular is methyl, ethyl, n-propyl, isopropyl, octyl, 1,1,3,3 - tetramethylbutyl, dodecyl, hexadecyl and eicosyl.

L is also phenyl or naphthyl.

L is also acyl, including carbamoyl, acetyl, propionyl, pelargonyl, myristyl, arachidyl, cerotyl, or melissyl.

L is also vinyl, allyl, and isopropenyl.

By known addition polymerization of vinyl, allyl, or isopropenyl, L can become a group

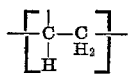

or

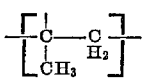

or

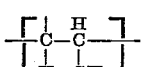

and the resulting compounds are polymers upon each second carbon of which recurs a group

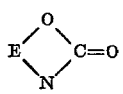

As to forming of the complexes of the present invention, polymers and non-polymers are alike.

The polymers need not be homopolymers; in addition to variety of complex-forming monomers there can be comonomers that do not form complexes but contribute usefully to the physical or other properties of the resulting polymer. Such comonomers include 1,3-butadiene, 2,3-dimethyl-1,3-butadiene, isoprene, piperylene, 3-furyl-1,3-butadiene, 3 - methyl - 1,3 - butadiene, chloro-1,3-butadiene, 2-bromo - 1,3 - butadiene, 2 - chloro - 3 - methyl-1,3-butadiene, styrene, p-chlorostyrene, p-methoxystyrene, α-methylstyrene, vinylnaphthalene, acrylic acid, methacrylic acid, methyl acrylate, ethyl acrylate, methyl α-chloroacrylate, methyl methacrylate, ethyl methacrylate, butyl methacrylate, methyl ethacrylate, acrylonitrile, methacrylonitrile, methacrylamide, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, N-vinyl-3-morpholinone, vinyl formate, maleic acid, itaconic acid, fumaric acid, crotonic acid, allyl alcohol, vinylfluoride, 2-chloroallyl alcohol, 1-allyloxy-3-chloro-2-propanol, N-vinylsuccinimide, N-tertiarybutyl acrylamide, N-tertiary-octyl acrylamide, 1,2-dichloropropene-2, 1,2-dichloropropene-1, trichlorostyrene, tetrachlorostyrene, pentachlorostyrene, o-methylstyrene, m-methylstyrene, p-methyl styrene, p-tertiarybutylstyrene, p-isopropylstyrene, p-phenylstyrene, p-benzoylstyrene, p-cyanostyrene, m-nitrostyrene, m-trifluoromethylstyrene, m - fluorostyrene, m - tertiary-butylstyrene, stearoylstyrene, oleoylstyrene, linoleoylstyrene, α-vinylnaphthalene, β-vinylnaphthalene, 1-(α-naphthyl)-propene-1,
2-(α-naphthyl)-propene-1,
2-(α-naphthyl)-butene-2,
3-(α-naphthyl)-pentene-2,
2-bromo-4-trifluoromethylstyrene,
β-bromo-α,β-diiodosytrene,
β-bromo-p-methylstyrene,
β-bromo-p-dinitrostyrene,
m-secondarybutylstyrene,
α,β-dibromostyrene,
β,β-dibromostyrene,
α-chloro-2,4,6-trimethylstyrene,
α-chloro-2,3,4,6-tetramethylstyrene,
β-chloro-o-nitrostyrene,
1-chloro-2-(p-tolyl)-1-butene,
4(1-chlorovinyl)-anisole,
2-(1-chlorovinyl)-4-methylanisole,
1-chloro-4-vinylnaphthylene,
4(1-chlorovinyl)-2-isopropyl-5-methylanisole,
4(2-chlorovinyl)-2-isopropyl-5-methylanisole,
p-cyclohexyl styrene,
2-ethyl-1-phenyl-1-butene,
3,5-diethyl styrene,
4-fluoro-3-trifluoromethyl-α-methyl-styrene,
α,α-trifluoro-m-propenyltoluene,
2-isopropyl-5-methyl-4-vinyl anisole,
2-methyl-3-phenyl-2-pentene,
methyl styryl ether,
N,N-dimethyl-m-vinylaniline,
2-(α-naphthyl)-2-butene,
1,1-diphenylethylene,
propenyl benzene,
stilbene,
1-vinylacenaphthene,
p-vinylbenzonitrile,
p-vinylbiphenyl,
2-vinylfluorene,
6-vinyl-1,2,3,4-tetrahydro-naphthalene,
p-vinylphenetole,
vinylbutyrate,
vinylbenzoate,
vinylquinoline,
2-vinylpyridine,
2-methyl-5-vinylpyridine,
4-vinylpyridine,
N,N-diallylacrylamide,
diallylamine, diallylmethacrylamide,
2,5-dimethyl-3,4-dihydroxy-1,5-hexadiene,
2,5-dimethyl-2,4-hexadiene,
divinylbenzene,
divinyl ester of diethylene glyycol,
trivinyl benzene,
2,7-dimethyl-1,7-octadiene,
1,7-octadiene,
p-diisopropenylbenzene,
1,3,5-triisopropenylbenzene,
p,p′-diisopropenyldiphenyl,
1,1,3,3-tetrallyl-1,3-propanediol,
1,1,3,3-tetramethallyl-1,3-propanediol,
4,6-dimethyl-4,6-dihydroxy-1,8-nonadiene,
2,4,6,8-tetramethyl-4,6-dihydroxy-1,8-nonadiene,
nonadiene-1,8,
2,8-dimethylnonadiene-1,8, acetyl triallyl citrate, ethylene, propylene, and maleic anhydride.

The polymers are typically of K-values according to Fikentscher of from about 2 to about 200.

The complectates are organic compounds containing hydrogen attached to a negative, that is to say, an anionic organic group. The negative or anionic organic groups are those generally recognized by chemists, for example as defined in Hackh's Chemical Dictionary by Grant (McGraw-Hill Book Company, New York, 3rd edition, 1944), page 565, see "negative group," second meaning. Within the scope of the definition, the negative groups to be employed are those which exclude inorganic groups.

More particularly, a complectate to be employed in the present invention is a compound of the formula $$Q_n-G-R$$

In this general formula, Q represents hydrogen or, by dissociation as in water, an electron remaining with the dissociated ion, as when the proton of hydrogen exists temporarily in isolation.

Further, in this formula, $n$ represents the valency of G with respect to Q.

G represents one of the moieties

—O—
—S—

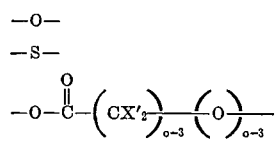

wherein X' is hydrogen, chlorine, or bromine;

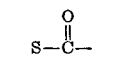

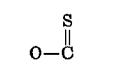

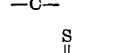

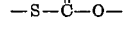

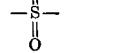

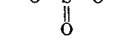

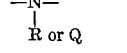

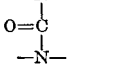

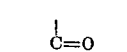

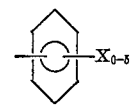

Also, in the present specification and claims, when X has the values hereinafter stated, R is selected from

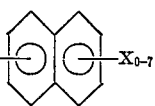

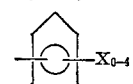

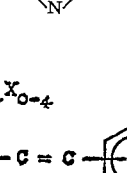

and

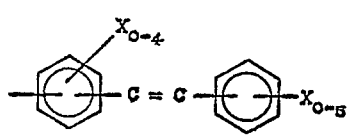

wherein X is selected from

—OH
—Cl, —Br, —I

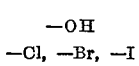

—C(CH$_3$)$_3$

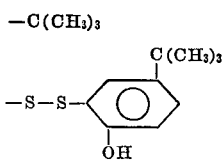

—CH$_2$SH

—NH$_2$
—NO$_2$
—O—loweralkyl

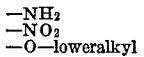

loweralkyl

—CH$_2$—CH=CH$_2$

—NH—loweralkyl

—N(loweralkyl)$_2$

In certain of the present complectates, the compound is best understood when G and R are taken together. In such compounds, these two moieties taken together can represent

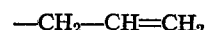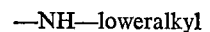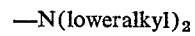

1

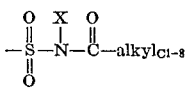

2

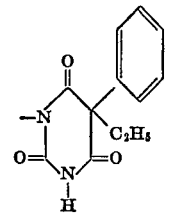

3

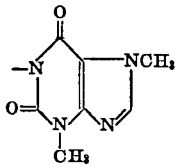

4

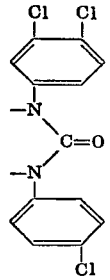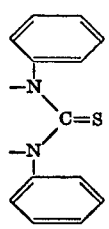

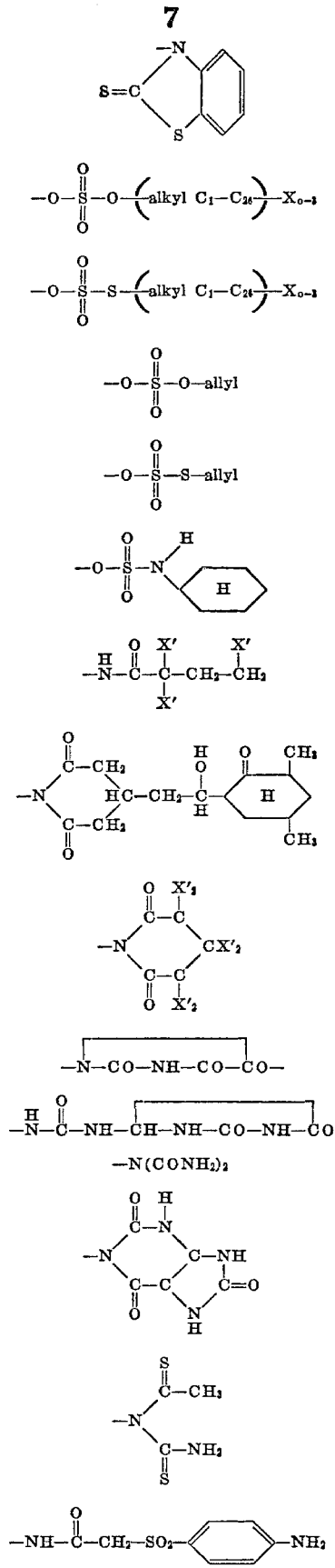

No byproduct is formed as a result of preparation of the instant complexes. By the employment of stoichiometric amounts of pure starting materials it is possible to prepare the present complexes in pure form. If the complectant be employed in excess, a resulting pure but unsatisfied complex will be prepared. If complectate be employed in excess, a resulting complex impure by reason of surplus complectate will be prepared. In the latter instance, employment of further complectant wherewith to prepare further complex binds the excess complectate, obviating need for other means of purification.

The utilities of the present complexes are, in general, control of solubility and dispersibility of bound substances in a variety of solvents and non-solvent media, making possible exhibition of desirable properties deriving from the complectate but not otherwise available; in a wide range of applications the complexes exhibit useful biological properties deriving from the complectates but greatly attenuated undersired toxic properties of the complectates. Many of the complexes exhibit the useful properties but almost none of the vapor pressure of vapor-producing complectates. The complexes have wide application in chemical purification, extraction, and synthesis. Complexes of good stability are prepared comprising complectates which are chemically unstable; but such complexes usually exhibit desired properties such as biological activities of the complectate. Other useful properties are apparent in the following portions of the present specification.

The entity represented by L in the present complectants is illustrated by hydrogen, methyl, ethyl, n-propyl, isopropyl, 1,1,3,3-tetramethylbutyl, lauryl, n-hexadecyl, eicosyl, pelargonyl, myristyl, arachidyl, cerotyl, melissyl as well as by intervening members of the series of which these are members and the substituent derivatives thereof whereof the substituents are such groups as dialkylamine, halo, aryl, substituted aryl, heterocyclic, cycloalkyl, and the like; the entity L may also be represented by aromatic rings and multiple condensed aromatic ring groups; by polyethylenic and substituted-polyethylenic polymer chains, and by such ethylenically unsaturated polymerizable monomeric moieties as vinyl, allyl, isopropenyl, 1,3,5-hexatrienyl, and 3:7:11-trimethyl-1:3:6:10-dodecatetraenyl.

The complectant materials to be employed according to the present invention, including many of the non-polymeric materials, are readily prepared according to the following general reaction

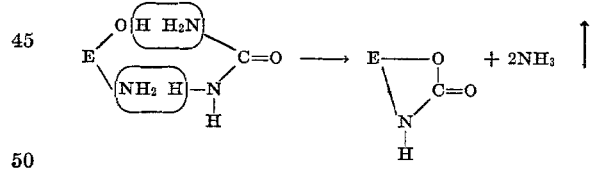

wherein E has the values hereinbefore set forth. By the choice of appropriate starting materials, a choice which, in view of the present teaching, lies readily within the skill of chemists, it is possible to prepare oxazolidinones and substituted oxazolidinones of an extremely wide range.

When it is desired to prepare a cyclic carbamate material the structure of which can be accurately predicted from the identity of the starting materials, the aminoalkanol material to be reacted with urea should, preferably, contain only one hydroxyl group; when only one such hydroxyl group is present the reaction follows the course indicated in the foregoing general reaction. When however, there is employed an amino alkanol material containing more than one hydroxyl group, ring closure and resulting formation of a cycliccarbamate may occur between the urea moiety and the amino alkanol moiety involving one, or, as the case may be, the other hydroxyl site. Thus, various reaction products of uncertain identity may be perpared. However, the reactions of two amino-diols have been studied, and they may be employed with confidence. When, the starting aminoalkanol compound is 4-amino-1,3-butanediol, the resulting compound is 5-hydroxyethyl-oxazolidin-2-one. When the starting compound is 2-amino-1,4-butanediol, the resulting compound is 4-hydroxyethyloxazolidin-2-one. Either of the said hydroxyethyl oxazolidinones may be dehydrated, as by heating gently in the presence of phosphorus pentoxide ($P_2O_5$) at temperatures in the general range of 50° to 100° and preferably 60° to 70° C. in an inert solvent such as dioxane, pyridine, or the like whereby the hydroxyethyl group, being dehydrated, yields a vinyl group as substituent on the said position of the oxazolidinone ring. In an alternative procedure, the oxazolidinone not bearing a substituent upon the ring nitrogen atom may be reacted with an alkenyl alkyl either in dimethyl formamide solvent and in the presence of mercuric acetate catalyst in a known trans-alkenylation reaction whereby to introduce, as substituent upon the ring nitrogen of oxazolidinone, or oxazinadinone, an alkenyl substituent.

By whatever route prepared, and with such alkenyl group as substituent upon whatever position or positions of the said heterocyclic ring or rings, the resulting compound are useful as complectants according to the present invention. If it is desired to avoid polymerization, a substance known to act as a polymerization inhibitor to prevent olefin-addition polymerizations, such as sodium hydroxide may be added to the non-polymeric vinyl-heterocyclic complectant compound.

Alternatively, the alkenyl-substituted heterocyclic complectant materials may, if desired, be polymerized. Such polymerization is readily effected in known procedures, for example by heating the desired monomer or mixture of monomers in a reaction medium such as water, in the presence of a small amount, for example 0.5 weight percent, of a polymerization catalyst such as benzoyl peroxide or $\alpha,\alpha'$-azobis(isobutyronitrile), at a temperature in the range of from 50° to 100° C. When it is desired to obtain the high molecular weight polymers, the polymerization is carried out at a temperature in the lower portion of the polymerization temperature range and with a relatively smaller amount, for example, 0.01 to 0.1 weight percent of catalyst. When it is desired to obtain the various low molecular weight polymers of the present invention, representing a very small number of monomeric moieties, the polymerization is carried out at a temperature in the upper portion of the polymerization temperature range, such as 80°–90° C., and in the presence of a relatively larger amount, for example 2 to 3 weight percent of catalyst. Upon completion of the polymerization, the components of the resulting mixture may if desired be separated according to molecular weight in known manners, such as fractional distillation, centrifugation, and the like.

The polymerization of the alkenyl substituted cyclic carbamates alone or with ethylenically unsaturated copolymerizable substances to prepare polymeric including copolymeric complectants to be used in the present invention proceeds in manners generally similar to the polymerization of other alkenyl monomers.

The present polymers and copolymers, in general, show little or no tendency to be injured by exposure to, for example, sunlight, air, and heat and other influences within a moderate temperature range near to living conditions of animal and vegetable organisms.

The present complectants and, correspondingly, the present complexes may readily be formed into desired shapes and sizes. Such forming is, in general, readily effected by the simple means of subjecting the complectants or complex in granular or pulverulent form to a formative pressure in such known procedures as tableting and the like.

The 3-(2-chloroalkyl)oxazolidin-2-ones and oxazinidinones and substituted derivatives thereof are readily prepared by the reaction of a haloalkyl alkanolamine such as 2-hydroxyethyl-2-chloroethyl amine, and ethylene carbonate, whereby the N(2-chloroalkyl)-cyclic carbamate is formed, together with ethylene glycol as byproduct of reaction. Substituents upon the hydroxyethyl moiety of the alkanolamine appear as substituent portions upon the group represented by E in the foregoing general formula; with the result that preparation of the desired complectants unsubstituted or with substituents in any desired variety is readily carried out.

The monomeric 3-, 4-, or 5-alkenyl cyclic carbamate compounds used as complectants or as intermediates for the preparation of polymeric complectants may be prepared by known methods wherein a (2-chloroalkyl)-2-oxazolidinone or oxazinidinone or a suitable substituted (2-chloroethyl)-2-oxazolidinone or oxazinidinone is dehydrochlorinated with an alkaline material such as an alkali metal lower alkoxide. These monomers are usually colorless liquids differing from one another in their solubilities in water and in many common organic solvents. Similarly, other derivatives are prepared by suitable known general procedures starting with, for example, the (2-chloroethyl)-2-oxazolidinone or oxazinidinone. The aroxazolidinones such as the benzoxazolidinones, naphthoxazolidinones and substituted benzoxazolidinones and substituted naphthoxazolidinones and the higher aroxazolidinones wherein a portion of a multiple condensed aromatic ring system comprises a portion of the oxazolidinone heterocycle may be prepared by known procedures. Such procedures are set forth in Houben-Weyl, Methoden der Organischen Chemie, vol. 8 (Sauerstoffverbindungen III), p. 144 and following (4th ed., Stuttgart, 1952). The preparation of benzoxazolidinones from salicylic acid amides by hypochlorite oxidation and spontaneous rearrangement is taught by Graebe and Rostovzeff in Berichte der Deutschen Chemischen Gesellschaft, 35 (3), (1902), p. 2751. The method may be employed to prepare higher aroxazolidinones with higher aromatic hydroxy carboxamides in which the substituent hydroxy and carboxamide moieties are on adjacent ring carbon atoms, such as 3-hydroxy-2-naphthamide 1-hydroxy-2-naphthamide, and 3-hydroxy-2-anthramide. The aroxazolidinones thus prepared may be transalkenylated in the manner hereinbefore set forth and the resulting monomeric alkenyl aroxazolidinones may thereafter be employed as complectants in the preparation of the present complexes, may be alkenyl hydrogenated, or halogenated or hydrohalogenated or polymerized or copolymerized in known manners to prepare numerous of the complectants according to the present invention and thereafter thus employed.

When it is desired to prepare the benzoxazinidinones, and the other multiple condensed ring systems with the cyclic carbamate compounds having 6 members in the heterocyclic ring, this may readily be accomplished by the oxidation, in the manner described, of 2(o-hydroxyphenyl)acetamide. Also, of course, in any such instance, the employment of starting hydroxyphenyl compounds upon the phenyl ring of which appear other substituents will result in the preparation of benzoxazolidinones or benzoxazinidinones bearing the said other substituents.

REPRESENTATIVE PREPARATIONS AND
THEIR PRODUCTS

Because complectant compounds of the sort defined, in wide variety, are usefully employed to prepare complexes with complectants, also in wide variety, of the sort hereinbefore defined, it is evident that the present invention includes a very large number of individual complex substances. Many hundreds of such complexes have been prepared and characterized, and their status as true complexes of the sort described fully established by recognized chemical tests. Among the operable complectates, a considerable number can be described as falling within each of several defined natural chemical groups. The following specific examples, which are illustrative only and are not to be construed as limiting the scope of the present invention, are divided into several natural sub-genera according to the type of complectate.

Subgenus I, which includes the hydroxyaromatic
complexes

The present subgenus consists of the complexes comprising a complectant of the sort hereinbefore defined in complex with a complectate in which Q is hydrogen, or an electron, as left from the dissociation of such substance in water; G is oxygen or sulfur, and R is of the significance previously stated, namely, phenyl, naphthyl, pyridyl and stilbenyl (1,2-diphenylvinyl) and their derivatives substituted as hereinbefore noted.

Aromatic compounds and certain ar-aliphatic compounds characterized by containing functional hydroxyl or sulfhydryl groups, associated or dissociated, combine with the complectants of the sort described hereinbefore to form complexes of the present invention. The present complectate substances include phenols, naphthols and higher multiple condensed aromatic hydrocarbon ring system compounds of the sort, and their sulfur analogues such as thiophenol together with their substitution products, and similar pyridinols.

The presence, as substituents as defined hereinbefore, of other atoms or radicals on the aromatic ring which is characteristic of complectates of the sort described is practically without significance as to the ability of such compounds to enter into formation of the present complexes.

Illustrative of the compounds successfully employed in the preparation of complexes according to the instant aspect of the present invention are; phenol, thiophenol, o-cresol, m-cresol, p-cresol, 2,3-dimethylphenol, 2,4-dimethylthiophenol, 2,5-dimethylphenol, 2,6-dimethylphenol, 3,4-dimethylphenol, 3,5-dimethylphenol, o-ethylphenol, m-ethylphenol, p-ethylphenol, 2,4,5-trimethylphenol, 2,4,6-trimethylphenol, 4-indanol, o-n-propylphenol, m-n-propylphenol, p-n-propylphenol, 2,3,5,6-tetramethylphenol, o-n-butylphenol, m-n-butylphenol, p-n-butylphenol, p-sec-butylphenol, p-n-amylphenol, carvacrol, thymol, o-allylphenol, p-allylphenol, p-propenylphenol, p-stearylphenol, 2,4 - dimethyl - 6-tert-butylphenol, o-cyclohexylphenol, vanillin, bourbonal, m-phenylphenol, p,p'-dihydroxydiphenylmethane, 2,2'-dihydroxybiphenyl, 2,4'-dihydroxybiphenyl, 3,3'-dihydroxybiphenyl, 4,4'-dihydroxybiphenyl, 1 - naphthol, 2 - naphthol, anthranol, 9 - hydroxyphenanthrene, 1-hydroxypyrene, pyrocatechol, resorcinol, hydroquinone, pyrogallol, 1,2,4-benzenetriol, phloroglucinol, m-chlorophenol, p-bromophenol, o-iodophenol, 2,4,6-tribromophenol, o-nitrophenol, m-nitrophenol, p-nitrophenol, 2,4-dinitrophenol, o-aminophenol, m-aminophenol, p-aminophenol, 2,5-diaminophenol, 1,3-dihydroxy-4-hexylbenzene, 3-pentadecylcatechol, 1,2-dihydroxy-3-(pentadecenyl-8')benzene, 1,2 - dihydroxy-3-(pentadecadienyl-8',11')benzene, 1,2-dihydroxy-3-(pentadecatrienyl-8',11', 14')benzene, 2,2'-methylenebis-3,4,6-trichlorophenol, 2, 2'-thiobis-4,6-dichlorophenol, 2,4,5-trichlorophenol, 2,2-di(4-hydroxyphenyl)propane, p,p' - sec - butylidenediphenol, 4,4'-isopropylidenedi-o-cresol, 4,4'-isopropylidenebis(2-phenyl)phenol; p,p' - (1,3-dimethylbutylidene)diphenol, p,p' - cyclohexylidenediphenol, 4,4' - isopropylidenebis(2-isopropyl)phenol, p,p'-sulfonyldiphenol, and other such compounds within the defined scope of the present subgenus.

The present aspect of the instant invention thus embraces complexes of the sort described whereof the complectate is an estrogen comprising a structure of the sort described: such hormones as estrone, estradiol, estriol, equilenin, stilbestrol, and hexestrol form complexes of the present invention. When, as complectant, a substance insoluble in ambient liquid is chosen, the formation of complex may be employed as a means of extracting estrogenic hormones and like complectable biologicals selectively from their fluid dispersions and from non-complectable substances such as the androgens. Other complectates are 3,6-dihydroxy-2,5-diphenyl quinone, 3,6-dihydroxy - 2,5 - di(4-hydroxyphenyl)quinone, thelephoric acid, and the like.

Also useful are the hydroxyaromatic derivatives from the destructive distillation of coal, 5-dehydroquinic acid, 5-dehydroshikimic acid, shikimic acid, tyrosne, homogentisic acid, and xanthurenic acid.

As has been pointed out, many useful chemical substances possess the specified necessary structure of a hydroxyl or sulfhydryl coupled with an aromatic radical, and possess in addition other structural elements which are herein disclosed as capable of bonding in complexes of the present invention. The presence, in such compounds, of the specified necessary —OH or —SH structure permits them to be considered with the present subgenus. The concurrent presence of other groups capable of entering the present complexes permits them, in some instances, to be considered as in some other subgenus. However classified, such compounds form the present complexes and dwell within the present invention. Among the compounds thus represented may be mentioned salicylic acid, 5-chlorosalicylic acid and 3,5-dichlorosalicylic acid, phenolphthalein; phenylsalicylic acid, phenolsulfonphthalein, phenoltetrachlorophthalein and tetraiodophenolphthalein; guaiacol, salicyl alcohol, methyl salicylate, ethyl salicylate, phenyl salicylate which may be called salol, gallic acid which may be known as 3,4,6-trihydroxybenzoic acid and protocatechuic acid.

The properties of the hydroxy aromatic and sulfhydryl aromatic complexes of the instant invention differ from the sum of the properties of the starting materials in that such complex derives its physical properties primarily from the complectant member, and its chemical and particularly biochemical properties primarily from the complectate member. Thus, for example, a complex of phenol assumes more nearly the vapor pressure, solubility in various solvents, and physical state characteristic of the complectant whereas such complex largely retains the chemical and in particular the biochemical such as the germicidal properties of phenol. The complex exhibits almost none of the vesicant and escharotic action of phenol upon animal tissues. For example, it can be held in the hand for a prolonged period of time without causing the skin cautery and necrosis typical of exposure to phenol.

The complexes of the instant subgenus of the present invention are illustrated by the following examples.

EXAMPLE 1-A

Complex of 3,5-dimethyloxazolidin-2-one with phenol

Various complexes of 3,5-dimethyloxazolidin-2-one and phenol were prepared. The complexes differed in the ratio of complectant to complectate. In a first preparation, 9.41 grams of phenol was added, with mixing and stirring, to 11.51 grams 3,5-dimethyloxazolidin-2-one. The oxazolidinone complectant was a liquid and the phenol disappeared in it promptly with resulting formation of a complex. The employed amounts of oxazolidinone compound and phenol in the present preparation were equimolecular. Infrared spectra of the resulting preparation gave no clear evidence of the presence of uncombined starting material and clearly indicated the presence of a complex. The complex was a colorless, practically odorless liquid of a viscosity moderately greater than the viscosity of water and having a refractive index $n_D$ (25° C.) of 1.4957.

A complex was prepared in all respects similar to the foregoing except that ½ the amount of the complectant was employed. The preparation was examined by infrared spectroscopy. The spectrum of the resulting preparation indicated the presence of uncompleted phenol, and a complex of 3,5-dimethyloxazolidin-2-one and phenol. The employment of excess complectate resulted in the preparation of a complex which was impure by reason of uncombined complectate. The preparation had the characteristic odor of phenol and a refractive index $n_D$ (25° C.) of 1.5130. Because phenol is soluble in the liquid complex, the entire preparation was a liquid.

A complex in all respects similar to the first foregoing complex of the present example was prepared except that ½ the stated amount of phenol was employed. The phenol disappeared promptly and completely and the odor of phenol disappeared with the preparation of a colorless, slightly viscous liquid comprising a complex of phenol with 3,5-dimethyloxazolidin-2-one and uncomplected oxazolidinone material. Infrared examination of the resulting preparation indicated the presence of both the said complex and the said uncomplected oxazolidinone material. The preparation had a refractive index $n_D$ (25° C.) of 1.4783.

Similar complexes are prepared, employing hydroxyaromatic and sulfhydryl aromatic compounds with, as complectants, 3-(1,1,3,3-tetramethylbutyl)oxazolidinone, with 3,5-distearyl oxazolidinone, and other complectants of the sort described.

EXAMPLE 1–B

Complex of 5-methyl-3-ethyloxazolidin-2-one and phenol

In the present example the complectant was the compound 3-ethyl-5-methyloxazolidin-2-one. The complectate was phenol. The complectant is a colorless, odorless, tasteless, innocuous liquid. Into this liquid was added, with mixing and stirring, 10 weight percent of solid phenol. The phenol disappeared in the resulting mixture, with formation of a complex.

The infrared spectrum of the resulting complex indicated significant shifts in the positions of bands indicating the carbonyl group.

The complex prepared according to the present example is a colorless and almost odorless liquid having a viscosity somewhat higher than that of water. It is readily dissolved in water and various organic solvents, and is strongly germicidal.

EXAMPLE 1–C

Complex of polymeric 5-methyl-3-vinyloxazolidin-2-one and phenol

In the present example the complectant was a polymer each of whose recurring units was derived from the monomer 5-methyl-3-vinyloxazolidin-2-one. The average molecular weight of the polymer was approximately 127,000 as determined by a standard light-scattering method, by ascertaining viscosity of solutions, and, most precisely, by ultracentrifuging. The complectant polymer was a bland, water-soluble innocuous solid, hyaline as a continuous solid and white in granular mass.

To 400 grams of a water solution containing 20 grams of the said complectant (that is to say, a 5 weight percent solution) was added, as complectate, a solution of 5 grams of phenol in 100 grams water. This solution presented both phenol and phenate ions. Each starting material was readily and completely water soluble. The phenol solution was added to the complectant solution all at once, with stirring. There was promtply formed a white, finely divided solid complex product which settled in the resulting mixture as soon as stirring was discontinued. Thereafter, the mixture was filtered to separate the solid complex product which was thereafter dried in air. As a result of these operations there was obtained 21.5 grams (86 percent of theoretically perfect yield based upon employed phenol) of a polymolecular complex of phenol and polymeric 5-methyl-3-vinyloxazolidinone. The complex contained approximately 81.2 percent complectant, 16.7 percent phenol, and 2.1 percent water, all by weight.

The liquid filtrate from which the insoluble complex product was removed was found, upon analysis, to contain 0.8 weight percent complectant corresponding to 3.2 grams. This filtrate portion was found to comprise a second complex composed of the same members as the first but with a lower relative content of phenol: the second complex was water-soluble, and was isolated by evaporation of solvent water.

The water-insoluble complex was studied in detail. It was determined by infrared spectrum analysis that it contained no free phenol, yielding a spectrum the relevant portions of which indicated a structure intermediate that of free phenol and the phenate ion.

Upon prolonged exposure to atmosphere containing not less than 60 percent relative humidity, the insoluble complex remained visibly dry and free-flowing whereas each starting material under similar exposure exhibited marked hygroscopicity, became distinctly moist and was not a free-flowing granular solid. The complex was practically odorless, indicating a practically complete suppression of vapor pressure of phenol.

The modification is germicidal properties manifest by the present complexes when compared with phenol is evidenced by the results obtained in the following test, known as the agar cup test. Nutrient agar plates of approximately 50 millimeters diameter and a few millimeters depth were prepared and inoculated by swabbing the surfaces thereof with a fresh broth culture of a test microorganism. Through the inoculated surface in approximately the center of the plate, a recess of approximately 12 millimeters diameter was cut and the recess was filled with the test compound, using approximately 0.1 gram of chemical substance to be tested. The resulting prepared plate was then incubated for three days under optimum conditions of temperature and humidity to encourage growth of the microorganism. The plates were thereafter examined for evidence of development, around the recess, of a zone wherein growth of the microorganism had been inhibited. Numerous complexes and compounds were thus tested. Check plates were similarly prepared and treated but without introduction, to the cut recess, of any chemical substance. In such test, phenol uniformly produced a zone of inhibition of from 15 to 20 millimeters radius, the limit of the agar plate. In contrast, the complex prepared according to Example 1–D gave a zone of inhibition of from 1 to 2 millimeters. Within this zone, the microorganisms were completely inhibited, but such inhibiting action was clearly confined to the said small zone. The results of the said test were essentially uniform and consistent when applied to the pathogenic bacteria *Staphylococcus aureus* and *Salmonella typhosa* as well as to the fungi, *Penicillium digitatum* and *Aspergillus niger*. Thus it is evident that the complex according to Example 1–A exhibits a bacteriostatic and fungistatic action comparable with that of the phenol starting material but less mobile in distribution in an essentially aqueous, semisolid medium. The complex is thus better adapted than the phenol starting material to be applied germicidally in defined areas for many surficial and topical applications.

When the preparation of the present example is carried out, the phenol appears to dissociate to phenate, to at least some extent, with the preparation of the complex of the present example.

The procedures of the present invention lead to a process useful in the waste-disposal and related chemical arts As will be clearly apparent from the teaching hereinbefore, an insoluble complectant which may be a cross-linked complectant subdivided, as by grinding or tabletting to any desired degree of particulate subdivision, may be employed as an absorption bed. Waste fluids such as waste waters or gases carrying phenolic, cresylic, and like aromatic hydroxyl-bearing substance, may be caused to pass through such bed, with the result that the phenolic substances become complected and bound with the insoluble complectate and thus removed from the fluid waste. By regulation of bed-depth, particle size, and other factors of which the regulation lies within reach of those skilled in the art in the light of the foregoing teaching, it is possible to effect removal, to any desirable degree, of phenolic wastes from such fluid waste-bearing effluents. Following such treatment which is regarded as a form of the well-known procedure of "scrubbing," the scrubbed fluid may thereafter be disposed of in known ways. After sufficient use, the complectant substance becomes exhausted as to capacity to form a complex according to the present invention. In such instance, the satisfied complex may be extracted with an organic solvent, as, for example, methylene chloride, whereby to strip off phenolic complectate and regenerate the capacity of the complectant to scrub further waste. The thus released complectate may, if desired, be recovered from the resulting solvent solution and thereafter employed in any suitable manner.

A further beneficial practice which the present invention makes possible is the employment of phenol in decontamination of water known to contain or suspected of containing living organisms deleterious in drinking water. In this embodiment, phenol is added to such contaminated water in an amount sufficient to destroy pathogenic microorganisms. Upon completion of the destruction of the microorganisms, the water may be passed through a succession of filtration beds containing an insoluble complectant according to the present invention, whereby the phenol may be complected, bound, and removed quantitatively from the water. The resulting purified water may then be used in any way in which water of the same general properties but containing no living microorganisms is to be employed. Complectate agents other than phenol having a similarly useful action may also be employed.

Yet another useful aspect of the instant invention is the employment of the present complectant substances in the preparation of complexes for protection from chemical injury caused by a complectate substance. An example of this practice is in the protection of human skin from phenol burns. A person whose skin might be exposed to injurious concentrations of phenol may apply, in advance of such anticipated exposure, a protective coating comprising a bland, innocuous complectant of the sort shown to be employed in the present invention. The coating may comprise inert carrying and bodying agents, soaps and the like and other substances. Not only has such coating the effect of providing a barrier between the skin and the phenol, it also has the capacity to form a complex with phenol, which complex is practically harmless.

Similarly, the formation of a complex of the sort described, after exposure to phenol, has the effect of bonding the phenol in a complex according to the present invention and thus inactivating it as a vesicant and escharotic. This action may be embodied in soaps, ointments, washes, and cleansing preparations comprising a particulate substance such as a gentle abrasive, sand, sawdust, and the like. Thus, subsequent to exposure to an injurious concentration or amount of phenol, upon removal of gross accumulations thereof, the exposed surface may be contacted with an innocuous complectant of the sort described or a composition comprising such complectant whereby to form a relatively harmless complex and interrupt or prevent escharosis and vesication.

EXAMPLES 1-D TO 1-L

Complexes of polymeric 5-methyl-3-vinyloxazolidin-2-one and polyhydroxyphenols

In the following examples the complectant was a polymer of which each recurring unit was derived from the monomer 5-methyl-3-vinyloxazolidin-2-one. The average molecular weight of the polymer was approximately 127,000, corresponding to the joining together, in the polymer, of approximately 1,000 monomeric units. The molecular weight was determined by a standard light-scattering method, by ascertaining the viscosity of solutions, and, most precisely, by ultracentrifuging.

To 1900 grams of 5 weight percent aqueous solution of complectant was added as a single portion, and with stirring at room temperature (20°-25° C.), a complectate solution consisting of 25 grams of polyhydroxyphenol as set forth below, dissolved in 125 grams ethanol. Upon the introduction of complectate solution there formed a disperse white finely divided complex, which, but for the turbulence caused by the stirring, tended to settle in the resulting mixture. The resulting mixture was filtered, the residue therefrom was washed with water, and thereafter warmed under subatmospheric pressure to vaporize and remove solvents and obtain in apparently dry form, a complex of polyhydroxyphenol and polymeric 5-methyl-3-vinyloxazolidin-2-one. The resulting complex was analyzed both by classical chemical reactions and by infrared spectrum analysis. In each instance the infrared spectrum indicated the absence of free polyhydroxyphenol starting material.

The complexes of the instant invention were tested for germicidal activity and for dispersion of such activity and for dispersion of such activity in culture medium in the manner set forth for the testing of the product of Example 1-D above.

The materials employed, and the results obtained are as set forth in the following table, along with certain comparisons with the free complectates, as indicated:

| Complectate | | Weight of complex product, grams | Complectate content [1] | Average [2] | Radius in millimeters of zone | | | |
|---|---|---|---|---|---|---|---|---|
| | | | | | (a)[3] | (b)[3] | (c)[4] | (d)[4] |
| Example: | | | | | | | | |
| 1-D | Resorcinol | 90 | 20.3 | 3.4 | 0 | 0 | 0 | 0 |
| 1-E | Hydroquinone | 111 | 18.3 | 3.9 | 5 | 3 | 0 | 0 |
| 1-F | do | — — | 23.5 | 2.3 | — | — | — | — |
| | Free hydroquinone | | | | 10 | 14 | 1 | 1 |
| 1-G | Pyrocatechol | 118 | 18.0 | 3.8 | 2 | 4 | — | — |
| 1-H | do | — — | 23.5 | 2.3 | — | — | — | — |
| | Free pyrocatechol | | | | 10 | 12 | 16 | 9 |
| 1-I | Pyrogallol | 98 | 13.6 | 6.3 | 10 | 6 | 0 | 0 |
| 1-J | do | — — | 17.5 | — | — | — | — | — |
| | Free pyrocatechol | | | | 20 | 20 | 10 | 16 |
| 1-K | Phloroglucinol | 94.5 | 13.2 | 6.5 | 0 | 0 | 0 | 0 |
| 1-L | do | — — | 17.5 | — | — | — | — | — |

[1] Weight percent of water-free complex.
[2] Number of complectant nonomeric moieties per phenol molecule.
[3] In (a) *Staphyloccocus aureus*, and (b) *Salmonella typhosa* in agar cup test.
[4] In (c) *Penicillium digitatum* and (d) *Aspergillus terreus* in agar cup test.
NOTE.—Blanks have been left in the table where no relevant data could be derived. Where no determination was made, dashes (— — —) have been put in the table. It is noted that certain complexes were prepared in duplicate; also, for comparison, certain data are included for the free complectates.

EXAMPLE 1-M

Complex of polymeric 5-methyl-3-vinyloxazolidin-2-one and 2,2'-methylene bis(3,4,6-trichlorophenol)

A solution of 65 grams 2,2'-methylene bis(3,4,6-trichlorophenol) in 250 grams dimethyl formamide was intimately mixed and blended with a solution of 60 grams polymeric 5-methyl-3-vinyloxazolidin-2-one dissolved in 250 grams dimethyl formamide. The resulting clear mixture was thereafter poured into 5 liters water at room temperature and intimately mixed and blended therewith, whereupon a white complex product precipitate formed in and, as stirring was discontinued, tended to settle the aqueous mixture. The product was thereafter removed by filtration, water-washed, and air-dried. The resulting complex product was found, by analysis, to contain 45.64 percent carbon, 4.35 percent hydrogen, 5.54 percent nitrogen and 26.3 percent chlorine, corresponding to a composition of approximately 50 weight percent 2,2'-methylene bis(3,4,6-trichlorophenol) and 50 weight percent polymeric 5-methyl-3-vinyloxazolidin-2-one. This proportional composition corresponds to 1 mole of the phenolic compound per each 3.2 mole cyclic carbamate moieties in the complectant polymer; as compared with a ratio of 1 mole of the phenolic compound for each 2 moles of carbamate moiety in a satisfied complex. The resulting complex had an average complectule weight of 280,000, as compared with an average molecular weight of 140,000 for the complectant.

In the present example, the starting 2,2'-methylene bis-(3,4,6-trichlorophenol) is of a very low solubility in water, a very disadvantageous property in view of extensive effort to use it as a soap germicide. The complex product of the present example was studied for water dispersibility and solubility in cold and hot water, in the presence of various surfactant agents, and with none; and was found to be much more readily dispersed or dissolved under all conditions than the uncomplected complectate.

constant weight. The resulting complex product was found to contain 6.36 weight percent chlorine, corresponding to 26.7 weight percent 2-chloro-4-phenylphenol or, 2.8 N-vinyl cyclic carbamate moieties per phenolic molecule. The filtrate from which the said product was removed by filtration was examined and found to contain a water-soluble complex comprising the same components but complected at different ratios. The water-soluble complex was found to comprise 4 weight percent phenolic complectate. This corresponds to a ratio of 9 N-vinyloxazolidinone moieties per phenolic molecule. The infrared spectra of the complexes gave no evidence of the presence of uncomplected 2-chloro-4-phenylphenol.

EXAMPLES 1–O TO 1–U

Other complexes according to the present invention were prepared employing the said complectant and, as complectates, various halogenated phenols. In each instance, the methods of preparation were substantially the same as those set forth hereinbefore and the products were, in each instance, white granular substances practically without odor, and practically non-irritating to handle. Specifically, the preparations carried out obtained products, and the agar cup tests thereof gave results, as set forth in the following examples:

| | Complectate | Complectate content [1] | Average [2] | Radius in millimeters of zone | | | | |
|---|---|---|---|---|---|---|---|---|
| | | | | (a)[3] | (b)[3] | (c)[4] | (d)[4] | (e) |
| Example: | | | | | | | | |
| 1–O | 2,4,5-trichlorophenol | 22.0 | 5.5 | 11–12 | 13–15 | 20 | — — | 20 |
| 1–P | do | | 6.5 | | | — — | — — | — |
| 1–Q | 2,4,6-trichlorophenol | 29.5 | 3.7 | 8 | 3 | 20 | — — | 20 |
| 1–R | 2,3,4,6-tetrachlorophenol | 41.6 | 2.4 | 7–8 | 2–3 | 20 | 20 | — — |
| 1–S | do | | 19.5 | | | — — | — — | — |
| 1–T | Pentachlorophenol | 66 | 1.1 | 10–11 | 1–2 | 11–12 | 7–8 | — — |

[1] Weight percent of water-free-complex.
[2] Number of complectant monomeric moieties per phenol molecule.
[3] In (a) *Staphyloccocus aureus*, and (b) *Salmonella typhosa* in agar cup test.
[4] In (c) *Penicillium digitatum*, (d) *Aspergillus terreus*, and (e) *Aspergillus niger* in agar cup test.
NOTE.—Where no determination was made, dashes (— —) have been put in the table. Some complectates formed 2 complex phases, one water-insoluble, the other water-soluble. In such instances, the first above named (having the lower average number of complectant nonomeric moieties per phenol molecule represents the water-insoluble, and the second (having the higher average number of complectant monomeric moieties per phenol molecule) represents the water-soluble such complex.

Complexes similar to the foregoing are readily prepared, when employing as complectate, variously, 2,2'-methylenebis(3-chlorophenol),
2,2'-methylenebis(3,4-dichlorophenol),
2,2'-methylenebis(3,5-dichlorophenol),
2,2'-methylenebis(3,6-dichlorophenol),
2,2'-methylenebis(3,4,5-trichlorophenol),
2,2'-methylenebis(3,5,6-trichlorophenol),
2,2'-methylenebis(3,4,5,6-tetrachlorophenol), and
the corresponding 2,2'-methylenebis(bromophenol) compounds including specifically 2,2'-methylenebis(3,4,6-tribromophenol), and other such compounds, such as the homologous compounds with other aliphatic bridging radicals connecting the aromatic nuclei.

EXAMPLE 1–N

Complex of polymeric 5-methyl-3-vinyl-oxazolidin-2-one and 2-chloro-4-phenylphenol A solution of 50 grams 2-chloro-4-phenylphenol dissolved in 250 milliliters methanol was poured slowly and with vigorous stirring into a solution of 200 grams polymeric 5-methyl - 3 - vinyloxazolidin-2-one in 3800 grams water. The vinyloxazolidinone polymer had an average molecular weight corresponding to the Fikentscher K-value of 30. As the alcoholic solution of phenolic complectate compound contacted the aqueous solution of polyvinyloxazolidinone complectant compound a white precipitate formed and was maintained, by the vigorous stirring, as a suspended turbidity in the resulting solution. Upon completion of the combination of the complectant and complectate substances, the resulting product was separated by filtration and dried under subatmospheric pressure and with gentle heating (not over 50° C.) to a In the foregoing table microorganism inhibition zone of 20 millimeters radius represents the limit of the agar plate and indicates total inhibition of the surface of the agar plate; in these instances the test does not admit of accurate comparison with other substances.

Illustrative of the utilities of the complexes according to the present examples is the use of a complex of o-phenylphenol and polymeric 5-methyl-3-vinyloxazolidin-2-one comprising complectant and complectate in approximately equimolecular proportions (based upon carbamate moieties in the polymeric complectant) as integumental preservatives for natural articles of food. The method is deemed to be especially adapted to be employed with articles of food of which the integument is not usually eaten. In representative operations, several dozen lemons and oranges, and also eggs were dipped in solutions of said complex leaving the said fruit or eggs wet with a film of such solution which was thereafter permitted to evaporate to dryness, to deposit a very thin coating of the said complex in air-dried form upon major portions of the surface of the eggs or the lemons or oranges. The articles of food so treated were thereafter exposed, along with similar articles similarly treated but with solutions of uncomplexed o-phenylphenol, to conditions favorable for their spoilage, to determine their susceptibility to spoilage. It was noted that the complex-treated eggs and the complex-treated oranges and lemons remained in good and edible condition much longer than, for example, the corresponding articles treated with uncomplexed o-phenylphenol. Untreated checks of the citrus fruit showed large, spoiled areas. The complexes of the sodium salts of 2,4,5-trichlorophenol, and 2,3,4,6-tetrachlorophenol and pentachlorophenol are similarly antimicrobial when employed in the same procedures.

A complex containing 28.6 percent by weight of polymeric 5-methyl-3-vinyloxazolidin-2-one and 71.4 percent by weight of total complex of 2,4-dibenzoyl-1,3-resorcinol was prepared, and was tested as a light and heat stabilizer by inclusion in a vinylidene chloride polymer latex, films prepared of which were slit and curled longitudinally to prepare weaving fibers using a technique disclosed in U.S. Pat. 2,858,186. The fibers containing such complex as stabilizer were exposed, under standard conditions and in standardized test procedures, to degradative effects of light and heat, along with similar fibers stabilized by the inclusion, in the parent latex of which they were prepared, or uncomplected dibenzoyl resorcinol; and with other such fibers containing no stabilizer. In such application the complected dibenzoyl resorcinol stabilizer exhibited, at the outset, the distinct advantage of much greater solubility in the aqueous latex dispersion than the uncomplected dibenzoyl resorcinol.

A comparison of the fibers containing firstly the present dibenzoyl resorcinol complex and, secondly, the uncomplected complectate, in amounts supplying the dibenzoyl resorcinol moiety in the same proportion to the weight of the yarn in each instance, disclosed the fact that the complected dibenzoyl resorcinol was a much more effective stabilizer than the uncomplected form. Moreover, in the complected form the dibenzoyl resorcinol appreciably stabilized the said fiber from degradation under the influence of heat whereas the uncomplected dibenzoyl resorcinol was virtually without effect against such thermal influence. Good stabilization is obtained when employing the complex in an amount equivalent to 10.5 percent dibenzoyl resorcinol by weight of latex polymer solids. The employment of the complex in amount equivalent to 2.5 weight percent dibenzoyl resorcinol by weight of latex polymer solids gives superior stabilization.

As employed, the dibenzoyl resorcinol complex is a thermoplastic resinous material exhibiting many of the properties of a super-cooled liquid, which has no sharp melting or freezing temperature but which shows distinct flow at approximately 130° C.

EXAMPLE 1-U

Complex of polymeric 5-methyl-3-vinyl-oxazolidin-2-one and 2,4-dihydroxybenzophenone In the present example, 291 grams of the complectate material, 2,4-dihydroxy benzophenone (which is also known as monobenzoyl resorcinol) was melted by heating to temperature between its melting temperature of 143° C. and an upper limit temperature of 160° C. At temperatures within this range, there was added to the melted benzophenone complectate 194.5 grams polymeric 5-methyl-3-vinyloxazolidin-2-one complectant. The complectant dissolved in the melted resorcinol complectate, and immediately upon dispersion of the complectant in the melted complectate, a complex formed. The resulting complex was permitted to cool. It did not give evidence of possessing a definite freezing temperature, but increased gradually in viscosity as the temperature declined until, at an undetermined temperature somewhat above room temperature it became palpably solid. The resulting complex contained, upon a weight percent of total complex basis, 60 percent 2,4-dihydroxybenzophenone and 40 percent of the cyclic carbamate complectant. This product, upon solidification, was ground to a fine powder in which form it appeared white.

EXAMPLE 1-V

Complex of polymeric 5-methyl-3-vinyl oxazolidin-2-one and 4,4'-thiobis(6-tertiarybutyl m-cresol)

The present example was carried out in procedural steps closely resembling those of the foregoing example. 178 grams (0.5 mole) 4,4'-thiobis(6-tertiarybutyl-m-cresol) was melted and in it was dispersed 63.5 grams polymeric 5-methyl-3-vinyloxazolidin-2-one (approximately ½ gram-mole of cyclic carbamate moieties). The polymeric complectant promptly dispersed and dissolved in the melted cresol compound with the resulting formation of a complex of which the composition, by weight of resulting complex, was 73.6 percent 4,4'-thiobis(6-tertiarybutyl-m-cresol) and 26.4 percent polymeric 5-methyl-3-vinyloxazolidin-2-one.

EXAMPLE 1-W

Complex of polymeric-5-methyl-3-vinyloxazolidin-2-one with the laevorotatory stereoisomer of epinephrine bitartrate The convenient bitartrate salt of the phenolic hormone constitutent laevo-epinephrine was employed as a complectate in the preparation of a complex according to the present invention. 13 grams water was used as solvent for both 3.2 grams 1-epinephrine bitartrate and 4.4 grams aqueous 40 percent solution of polymeric 5-methyl-3-vinyloxazolidin-2-one having a molecular weight corresponding to the K-number of Fikentscher of 32.4. The resulting precipitate was separated by filtration from the preparative mixture and washed with water to obtain a complex of the laevorotatory stereoisomer of epinephrine (in the form of its bitartrate salt) with polymeric 5-methyl-3-vinyloxazolidin-2-one. The other stereoisomers of the complectate, or mixtures of them, are also successfully employed in preparing the present complexes.

The product of the present example was tested in standard biological assay techniques and found to exhibit the various physiological actions characteristic of epinephrine and, upon the basis of epinephrine content, to be the equivalent of uncomplected epinephrine: but to be of improved stability under degradative influences such as exposure to light and air.

Epinephrine in uncombined form, or as a mineral acid salt such as the hydrochloride also forms a useful complex according to the present invention.

EXAMPLE 1-X

Complex of polymeric 5-methyl-3-vinyloxazolidin-2-one and 4,4'-oxydi-α-toluenethiol A complex was prepared by melting (at about 31° C.), as complectate, 4,4'-oxydi-α-toluenethiol of the formula

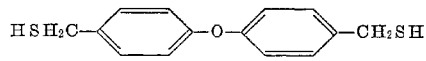

The present complectate was prepared by heating 2,2'-oxybis(p-phenylene methylene)bis-(2-thio, dihydro)pseudourea with sodium hydroxide in aqueous solution at about 90° C. for about 65 minutes, and thereafter acidifying; chilling to solidify the oily bottom layer and thereafter decanting the aqueous supernatant layer and subsequently washing the remaining solid repeatedly with cold ethanol. The said pseudourea starting material was prepared according to the methods set forth in U.S. Pat. 2,906,773. To the melted thiol compound was added an amount of polymeric 5-methyl-3-vinyloxazolidin-2-one twice equimolecular upon the basis of carbamate moieties therein. The said complectant disappeared with complexing in the melted complectate which was thereafter chilled to solidify, obtaining a glassy solid complex material. The resulting complex had no sharp melting temperature but was solid at temperatures considerably above the melting temperature of the complectate. This is believed to be explained by the cross-linking at the energy levels characteristic of bonding of the present complexes, by the involvement of the -thiol groups at the extremities of the molecule of the present complectate, with complectate sites variously disposed within the polymeric complectants. The instant complex is useful as an aquatic herbicide but is relatively non-injurious to terrestrial plants. It differs in various ways from the complectate, notably in suppression of vapor pressure by reasons of which the complex is relatively inodorous.

EXAMPLE 1-Y

Complex of vanillin and polymeric 5-methyl-3-vinyloxazolidin-2-one

A dry mixture of 40 grams vanillin meeting the specification therefor in the United States Pharmacopoeia, Revision XV, and 60 grams of polymeric 5-methyl-3-vinyl-oxazolidin-2-one of an average molecular weight corresponding to a Fikentscher K-value of 30, was placed on a roll mill comprising two tangential corotating hollow steel rollers, one cooled by an internal flow of cold water, the other heated internally by steam at about 130° C., for a period of time to provide intimate mixing and blending, partial fusion and co-compression of the component materials and heating to an upper limit temperature of about 130° C. Under these conditions a complex formed as a pale yellow thermoplastic solid which tended to adhere to, and was repeatedly removed from the cold roller and further milled, which, upon cooling, became a rubbery solid. This solid was allowed to stand undisturbed for five days, during which time it in some way changed form, becoming a hard and brittle solid having a strong but pleasant odor of vanillin. This brittle material was then reduced in a ball-mill to a fine powder. Similar complexes were prepared from the same starting materials employing other techniques such as mixture of solvent solutions of materials, as have been fully set forth in other preparations hereinbefore. Also, such complexes employing the starting materials in various proportions were also prepared.

The vanillin complexes were tested for loss of complexed vanillin as a result of heating, and the results of such test were compared with similar loss from a sample of vanillin U.S.P. (XV). Two samples of vanillin were employed as check samples; one was in the form of fine crystals of a highly refined commercial grade, the other was prepared therefrom by melting a portion of such vanillin at 125°, casting it in a mold to obtain a solid block approximately 2 inches long, ¾ inch wide, and ¼ inch thick. This procedure was carried out to obtain a solid sample in order to compare the volatility of the vanillin in such form with the complex in the form of coarse chunks of the same order of size as the cast block of vanillin. Two different complex samples were employed in the test. One such sample was prepared by contacting together one mole of vanillin and 0.8 mole (on a carbamate moiety basis) of complectant, and was employed without subsequent purification. It is believed that the product contained traces of free vanillin, representing the excess thereof over the amount which the complectant could bind. A second sample was prepared by contacting together 1.8 moles of complectant for each mole of vanillin. This second sample was also employed without further purification but is believed to have contained little or no uncompleted vanillin.

In carrying out the test, the two vanillin samples and the two complex samples were weighed and placed, as approximately equal layers, in separate evaporating dishes and heated in the same oven under subatmospheric pressures of from 6 to 10 millimeters mercury. After 41 hours at 75° C. the finely crystalline vanillin had lost 9.5 percent of its initial weight, the cast block of vanillin had lost 6 percent, whereas each of the complex samples had lost 2 percent. At the end of the said 41 hours the temperature was increased to 100° C. within the range of subatmospheric pressure previously stated, and maintained thereat for 28.5 hours. At the end of this time, the finely crystalline vanillin had lost 49 percent of its initial weight, the cast block of vanillin had lost 30 percent; the satisfied complex had lost 3 percent and the unsatisfied complex 6 total percent. Temperature was thereafter increased to 125 °C. under the stated pressures, and maintained thereat for 11 hours. At the end of this time, the finely crystalline vanillin had lost 94 percent of its initial weight, the cast block of vanillin had lost 97 percent, the satisfied complex had lost 9 percent, and the unsatisfied complex 7 percent. Heating at 125° C. was continued for 5.5 hours further by which time both samples of vanillin had completely evaporated. The satisfied complex had lost 16 percent initial weight and the unsatisfied complex 8.5 percent. Upon cooling, the complexes were found to exhibit the characteristic odor of vanillin. A sample of the unsatisfied complex surviving the above vacuum-oven test was stored in a sheltered open container at room temperature for a period of more than one year. At the end of this time the said sample had the characteristic odor of vanilla scarcely diminished and, upon superficial examination, appeared to have undergone no noticeable change during that time.

Vanillin employed in the preparation of the present complex was of unknown origin but was believed to be synthetic. The complectant was a water-soluble polymer. However, related complexes may readily be form employing vanillin from natural sources such as the so-called vanilla bean, foliage of young plants of the genus Melilotus, and the like. In this connection it is to be noted that a higher homologue of vanillin, bourbonal, wherein remains an aromatic hydroxyl structure which dwells within the present subgenus of this invention, also forms a complex according to the present invention. Thus, a multiple complex is readily prepared wherein various fragrance-producing substances desirable in food, pharmaceuticals, perfumes, industrial fragrances and the like may efficiently be removed from their natural sources in a form which renders the desired fragrances readily available. Moreover, by the judicious selection of a complectant according to the present invention, whether alone or in solution, it is possible to prepare complexes which are, optionally, liquids, highly viscous liquids, soft solids, or firm solids soluble in any of a wide range of solvents or, as may be desired, insoluble in all known solvents by reason of extensive cross-linking.

When both complectant and complectate moieties of the sort described recur as members of polymers, the multiple complex bonding which arises between the such molecules tends to give rise to properties, such as high viscosity and high swellant retention, peculiar to such polymer-polymer complexes. Moreover, one of the complectant and complectate may be polymeric and the other may be a polymerizable non-polymer; such substances may be complected together and the polymerizable member may thereafter be polymerized in situ without breaking the complex. The resulting change in properties may at times be extraordinarily noticeable.

EXAMPLE 1-Z

Complex of polyvinylphenol with polymeric 5-methyl-3-vinyl oxazolidin-2-one

In the present example the complectant is polymeric 5-methyl-3-vinyl oxazolidin-2-one having an average molecular weight corresponding to a K-value of Fikentscher of 30. The present complectate is a polymer prepared by the homopolymerization of p-vinylphenol. The monomer may be prepared in numerous known procedures, one of which is set forth in the Journal of the American Chemical Society, volume 80, page 3645 (1958). See also the Journal of Organic Chemistry, volume 23, page 544 (1958), and volume 24, page 1345 (1959). The melting temperature of the polymer varies according to the macromolecular weight. A representative polymer melted at 229° C.

In preparing the present complex dimethylformamide solutions of complectant and complectate in amounts approximately equimolecular upon the basis of recurrent functional moieties, are intimately mixed and blended together. Each of the starting solutions originally is of a viscosity only slightly greater than the viscosity of the solvent. Upon combination of complectant and complectate solution, however, an immediate and very conspicuous increase in viscosity takes place. The combination of the two solutions is carried out with prompt stirring immediately as contact between them is effected; after a few minutes standing the resulting mixed solution becomes a very firm gel. This gel is the desired complex together with entrapped portions of solvent, which solvent may be removed, if desired, by solvent extraction employing, as solvent, for example, hexane. The resulting washed complex may thereafter be warmed in a vacuum oven to vaporize and remove solvent and obtain the complex in relatively pure form as a white solid which may, if desired, be finely powdered. The resulting complex is solvent-swellable and of relatively low solubility in many common solvents.

A complex comprising a bifunctional complectate having aromatic hydroxyl and carboxyl groups A complex of the present invention was prepared in which the complectate was the polyfunctional compound salicylic acid, which may also be called orthohydroxybenzoic acid or orthocarboxyphenol. In the complecting action, the carboxyl group and the hydroxyl group are of relatively similar levels of activity and both are bonded in the resulting complex.

The resulting complex possesses many of the desirable properties characteristic of salicylic acid but with numerous differences from the uncomplected acid which, in many applications, are advantageous. An illustration of the modification of the behavior of salicylic acid which resulted from its complection in the present example, is the difference between complectate and complex in toxicity for numerous microorganisms. For example, salicylic acid inhibits the growth of *Aerobacterium aerogenes, Erwinia carotovora, Salmonella typhosa, Staphylococcus aureus, Penicillium digitatum* and *Rhizopus nigricans*. For this reason, the use of salicylic acid is contraindicated in many applications wherein it is desired to cultivate or employ the growth of any of these organisms and many other similar organisms. In contrast, the present complex of salicylic acid gave no inhibition of any of the said organisms under laboratory culture test conditions.

Salicylic acid is a well-regarded keratolytic agent. The complex exhibits little or no keratolytic property.

Example 2.—Complex of salicylic acid and polymeric 5-methyl-3-vinyl oxazolidin-2-one A solution of salicylic acid in dimethyl formamide was added to an aqueous solution of polymeric 5-methyl-3-vinyl oxazolidin-2-one containing the said polymeric substance in an amount equimolecular (upon a monomeric or cyclic carbamate moiety basis) with the salicylic said complectate. The addition was carried out dropwise, and with continuous stirring at approximately room temperature. At the introduction of each drop, a precipitate formed and, except for the stirring, would have settled in the resulting complection mixture. Upon completion of the addition of the salicylic acid, the resulting preparation was filtered and a solid precipitate removed therefrom, washed with water and gently warmed and dried overnight under atmospheric pressure to vaporize and remove water. As a result of these operations, there was obtained a white powdered complex of polymeric 5-methyl-3-vinyl oxazolidin-2-one with salicylic acid, which, upon analysis, was found to have a composition corresponding to 60.4 percent of the polymeric complectant, 37.8 percent salicylic acid and 1.8 percent water, all by weight of total composition.

Subgenus II which includes the aromatic carboxylic acid complexes

The present subgenus consists of the complexes comprising a complectant of the sort hereinbefore defined, complected with a complectate selected from an aromatic carboxylic acid, aromatic thiocarboxylic acid, aromatic thionocarboxylic acid, aromatic thiolocarboxylic acid, aromatic carbodithioic acid, or the dissociated ion from one of them in water. The complexes are, in general, chemically stable under normal human living conditions and over a substantial range of temperatures, pressures, and other environmental factors near to such conditions. The present complexes comprising aromatic carboxylic acids tend to derive their chemical and particularly their biochemical properties predominantly from the corresponding properties of the free complectants. Also, the aromatic carboxylic and thiocarboxylic acid complexes exhibit unique properties not found in either starting material.

The present complexes are formed successfully and useful products result when the aromatic carboxylic acid compounds used as complectates contain, as ring substituents, additional to the said carboxyl groups such other groups as hydroxyl, halogen, hydrocarbon groups including alkyl and aryl groups, nitro groups, amino groups, oxalkyl groups and others.

Aromatic acids characterized by hydroxyl and thiol substituent groups, and various other groups may also be employed in preparation of the present complexes. Correspondingly, when an aromatic nucleus contains, in addition to a group of the sort defined which makes it to be an aromatic carboxylic or thiocarboxylic acid or the like, other groups such as hydroxyl, sulfhydryl, and any of numerous others, such groups may combine with the complectant whereby complexing arises by reason of both kinds of such sites. Similarly, when polycarboxylic aromatic acids are employed as complectates, complex bonding arises between the complectant sites and any or all of such aromatic carboxyl group sites on the aromatic nucleus. The proximity to one another of such sites on an aromatic nucleus has no necessary connection with the proximity to one another of the complexing sites which will be occupied on the complectant. The relationship remains essentially stoichiometric in the sense that, under appropriate conditions, each complectable site on the complectant will bond with one such complectable site on the complectate.

Illustrative of the aromatic carboxylic and thiocarboxylic acids and the like which may be employed in the preparation of complexes according to the present invention are: benzoic acid, salicylic acid, 4-amino salicylic acid, anthranilic acid, 5-chlorosalicylic acid, 5-bromosalicylic acid, o-cresotinic acid, phthalaldehydic acid, 5-bromoacetylsalicylic acid, 5-chloroanthranilic acid, 2-chloro-4-nitrobenzoic acid, 3,5-dichloroanthranilic acid, 5-iodosalicylic acid, 5-iodoacetylsalicylic acid, 4-phenylsalicylic acid, phthalic acid, isophthalic acid, terephthalic acid, hemimellitic acid, trimellitic acid, trimesic acid, mellophanic acid, prehnitic acid, pyromellitic acid, naphthalic acid, 3-phenylsalicylic acid, 5-phenylsalicylic acid, 4,4'-diphenylcarboxylic acid, 1-naphthoic acid, 2 - naphthoic acid, o-toluic acid, m-toluic acid, p-toluic acid, o-chlorobenzoic acid, m-chlorobenzoic acid, p-chlorobenzoic acid, o-nitrobenzoic acid, m-nitrobenzoic acid, p-nitrobenzoic acid, 3,5-dinitrobenzoic acid, m-hydroxybenzoic acid, p-hydroxybenzoic acid, 3,4,5-trihydroxybenzoic acid, p-methoxybenzoic acid, 3,4-dimethoxybenzoic acid, m-aminobenzoic acid, p-aminobenzoic acid, 2,2'-biphenyldicarboxylic acid, benzenehexacarboxylic acid, piperidinecarbodithoic acid, and the like.

The following examples illustrate the complexes of the cyclic carbamates of the sort described with aromatic carboxylic acids.

EXAMPLE 3–A

Complex of benzoic acid with polymeric 5-methyl-3-vinyl oxazolidin-2-one

A solution of 25 grams benzoic acid dissolved in 125 grams ethanol was added dropwise, with stirring, at room temperature, to 2,000 grams of an aqueous complectant solution containing 5 percent by weight of total solution of polymeric 5-methyl-3-vinyl-oxazolidin-2-one. The polymer had an average molecular weight distribution corresponding to the K-value of 30 according to Fikentscher. As each drop of benzoic acid solution entered the complectant solution, a white precipitate formed. When the stirring was interrupted, briefly, the white precipitate tended to settle in the mixture. Upon the completion of the addition of benzoic acid solution the resulting mixture was filtered and the desired complex removed as a residue solid. The remaining filtrate was free from visible turbidity. Upon analysis, the complex product was found to contain 55.87 percent carbon, 6.86 percent hydrogen and 8.32 percent nitrogen. Of the total weight of the resulting complex, after simple drying in open atmosphere it was found that the complectant comprised 75.5 weight percent, benzoic acid complectate comprised 20.1 weight percent, and water 4.4 weight percent. The infrared spectrum of the complex disclosed no free benzoic acid.

The complex according to the present example was tested for germicidal activity in the standard agar cup test as described in Example 1–C of the instant specification. As a result of these tests it was determined that the present complex gave complete inhibition of both *Salmonella typhosa* and *Staphylococcus aureus* for a zone of 4 millimeters radius surrounding the recess in the agar plate; and gave complete inhibition of *Aspergillus terreus* and *Penicillium digitatum* at all points with which the complex came into contact and for a zone of 1 millimeter radius surrounding the recess in the agar medium.

The complex is useful for specifically localized application without undesired migration to more remote areas.

EXAMPLE 3–B

Complex of benzoic acid with polymeric 5-methyl-3-vinyl oxazolidin-2-one

The complex of the present example closely resembles that of Example 3–A, foregoing. However, the complectant differs in having a higher average molecular weight as represented by the K-value of Fikentscher of 32; the complex is prepared in a different method wherein the complectant is added to the molten complectate in the absence of solvent.

Benzoic acid having a melting temperature of approximately 123° C. (37.6 grams; approximately 0.31 mole) was gently heated to a temperature above its melting point but not higher than 145° C. To the molten benzoic acid 39.1 grams (approximately 0.307 mole on a monomeric basis) polymeric 5-methyl-3-vinyloxazolidin-2-one was added slowly, portionwise and with continuous stirring. The polymeric complectant, initially a white crystalline powder, appeared to dissolve in the molten benzoic acid. The resulting apparent solution, which was then at temperatures greater than the melting temperature of benzoic acid, was then transferred to a shallow tray wherein it was allowed to cool to approximately room temperature and, during cooling, gradually to solidify, which it did without giving evidence of a sharp freezing temperature. The resulting product was transferred to a high-speed impeller-type mixer ("Waring Blendor"), wherein it was finely subdivided. In finely powdered form it was a white complex of the said starting materials together with a moderate excess of benzoic acid. The assigned structure was confirmed by infrared spectrum analysis.

EXAMPLE 3–C

Complex of polymeric 5-methyl-3-vinyl oxazolidin-2-one and coal acids

In the present example various complexes were prepared in which the complectant was polymeric 5-methyl-3-vinyl-oxazolidin-2-one and the complectate was a coal acid composition as defined in U.S. Pat. 2,895,935. See particularly column 1, line 65—column 2, line 1, and column 6, line 67—column 7, line 11.

The present complectate was a water-soluble solid of a dark brown, nearly black, color, in which no crystal structure was clearly discernible; it was strongly acidic and had an equivalent number of about 73; that is to say, the equivalent of a molecular weight of about 73 for each acidic hydrogen. Actual molecular weight represents a plurality of such equivalents per molecule.

In one preparation, 20 percent aqueous solutions of each of the complectant and complectate were prepared. One hundred milliliters of 20 percent aqueous coal acid solution was poured into 100 milliliters 20 percent aqueous solution of polymeric 5-methyl-3-vinyloxazolidin-2-one. At the interfaces where the solutions came into contact one with another there formed an insoluble complex according to the present invention in the form of a membrane at the interface between the solutions. Formation of the membrane took place almost instantaneously.

The mixture was explored with a glass stirring rod. The membrane was quite thin, elastic, yielding, fairly tough and cohesive. In an attempt to carry the complection to completion the membrane was punctured. At the new interface thus formed, further such membrane formed. Repeated efforts to stir the mixture led to further production of such membranous complex at the interfaces at which the solutions came in contact one with another, and in the resulting mixture the starting material solutions became irregularly divided into disparate bullate fluid inclusions within a disordered mass of the said membrane.

By contacting the solutions together in an orderly manner and removing the resulting film or membrane as formed, it is possible to remove the complex membrane as a continuous strip, filament, or sheet. It may thereafter be used as prepared, or dried intact, dried and pulverized, and the like. When moist, contacting surfaces of the said membrane tend to cohere one with the other.

In a further preparation, 200 milliliters 5 percent aqueous solution of polymeric 5-methyl-3-vinyloxazolidin-2-one were mixed and stirred into 200 milliliters 5 percent aqueous solution of coal acids of the sort described. A precipitate promptly formed and settled immediately leaving an orange-yellow supernatant liquid. The precipitate was a tan to brown semi-solid "cheesy" complex of the said starting material.

Each of the foregoing materials was finely subdivided and dispersed in a large excess of water at room temperature and found to be soluble at a concentration of 0.1 percent by weight of water.

The infrared spectrum of the complex shows the almost complete absence of free carboxyl groups as contrasted with the spectrum of the starting coal acids which indicates an average of from 2.5 to 5 carboxyl groups per average molecule of molecular weight approximately 250.

An infrared scan of a portion of a liquid filtrate from which the said solid complex is removed by filtration discloses the presence, in the filtrate, of a second coal acids complex comprising complectant in a much higher weight proportion than the composition of the said precipitate complex. The said water-soluble complex is recovered by evaporation of solvent water. The said water-soluble complex is found also to be a near-white solid which, after grinding, is a free-flowing granular to powdered material.

The coal acid complectates of the present examples are shown in the said patent pertaining thereto to be useful in the preparation of bonding agents which are in the nature of cross-linked polyester resin materials which are desirably employed as binders in the preparation of molds or forms from particulate material such as sand molds. In such procedure the coal acids together with an alcohol which may desirably be a polyhydroxy aromatic alcohol are mixed and blended together with the particulate material such as foundry molding sand in the presence of moisture, formed to a desired shape, and thereafter dried and "cured," that is to say, exposed to heat for a period of time sufficient to effect the desired poly-esterification reaction between the coal acids and the, for example, polyhydroxyaromatic alcohol. Thereafter the mold is ready for employment. This method suffers the disadvantage that there is an interval after the mixture and forming of the mold and before curing has been effected in which the mold is susceptible of deformation, breakage, and the like, having, in the uncured condition, a very low strength.

When there is employed a complex according to the present example instead of the uncomplected coal acids, either of two improvements in this condition is available. When, for any reason, it is desired to form the molding sand together with bonding materials in the presence of moisture, the present complex renders the resulting moist mold distinctly more tenacious and cohesive, representing a distinctly advantageous increase in physical strength before curing. This may be enhanced by the employment of an unsatisfied coal acids complex wherewith the polyhydroxyaromatic reactant which is to esterify the coal acids may also join the present complex. When it is desired to prepare and shape the desired mold in the absence of moisture the employment of a coal-acids complex of the present example renders the pressure-formed composition distinctively tenacious and cohesive in the absence of moisture. Moreover, the presence of the said complex renders the sand composition readily formable and reformable without loss of cohesion in the resulting formed and reformed uncured mold.

The said tenacity is sufficiently great that the thus-prepared mold may be lightly used without curing.

EXAMPLE 3-D

Complex of p-vinylbenzoic acid and polymeric 5-phenyl-3-vinyloxazolidin-2-one polymerized in complex In the present example, a complex is first formed between the polymeric complectant and the monomeric complectate. Thereafter, without breaking the complex, the said monomer is polymerized, giving rise to a polymer-polymer complex prepared in situ.

The present complectant is a polymer of 5-phenyl-3-vinyloxazolidin-2-one of which the monomer is a solid melting at 79.5–80.5° C. The polymer does not exhibit a sharp melting temperature but softens gradually at temperatures in the vicinity of 100° C. and liquifies entirely to a viscous liquid at temperatures below 200° C.

In preparing the instant complex, separate solutions in xylene are prepared, one containing the monomeric complectate and the other an equimolecular amount, upon the basis of cyclic carbamate moieties, of polymeric complectant. The solutions are prepared at room temperature. The resulting solutions are gently mixed and stirred together to effect complete dispersion of each in the other, whereupon the complex promptly forms. The resulting solution is then evaporated to dryness at room temperature and under sub-atmospheric pressures to remove solvent and obtain a colorless to white solid complex of polymeric 5-phenyl-3-vinyloxazolidin-2-one and p-vinylbenzoic acid; the complection involves the carboxyl moiety of the complectate and the cyclic carbonyl group and adjacent atoms of the complectant carbamate moieties; complectate vinyl groups are essentially unencumbered and free to react.

The polymer-monomer complex thus prepared is then gradually warmed in dimethyl formamide solvent. The resulting mixture liquifies to a colorless fluid at a temperature below 150° C. Under these conditions, a small conventional amount of polymerization catalyst (benzoyl peroxide) is added whereupon the vinyl groups of the complectate p-vinylbenzoic acid polymerize. The polymerization is accompanied by an increase in viscosity of the resulting solution. When polymerization has gone forward to the desired degree, the entire mixture is dispersed slowly and with stirring into water at approximately room temperature, whereby the dimethylformamide solvent is dispersed as an aqueous solution in which the polymer-polymer complex precipitates. The complex is thereafter recovered by filtration, washed with water, and dried to obtain a complex of polymeric p-vinylbenzoic acid with polymeric 5-phenyl-3-vinyloxazolidin-2-one as a white, finely divided granular material exhibiting no distinct melting temperatures but decomposing with heating at temperatures not much above 300° C.

Subgenus III, which includes the aryloxy-aliphatic acid complexes

An aryloxyaliphatic acid of which the oxyaliphatic straight chain is of not more than 3 atoms of carbon and one atom of oxygen whereby the carboxyl group is separated from the aromatic nucleus by not more than 4 atoms in an oxyaliphatic chain; and the ion of the sort formed from the dissociation of such acid are complectates of the present invention.

A complectate which may be regarded as representative is phenoxyacetic acid. The presence, as substituents, of atoms or radicals defined herein as on the aromatic ring is admissible. The aliphatic chain may be substituted as hereinbefore noted.

Illustrative of the aryloxyaliphatic compounds which may be employed as complectates in the instant invention are the following: phenoxyacetic acid, 2,4-dichlorophenoxy acetic acid, 2,4,5-trichlorophenoxy acetic acid, 2-methyl-4-chlorophenoxyacetic acid, phenoxypropionic acid, 2,4-dichlorophenoxypropionic acid, 2,4,5-trichlorophenoxypropionic acid, phenoxybutyric acid, 2,4-dichlorophenoxybutyric acid, 2,4,5-trichlorophenoxybutyric acid, 2-methoxy-4-chlorophenoxyacetic acid, 3-phenoxy-2,2,-dichloropropionic acid, and like compounds, and ions as formed from their dissociation in water, many of which are herbicides and many of which are used to cause beneficial changes in plant growth.

The following examples illustrate this subgenus of the present invention.

EXAMPLE 4-A

Complex of polymeric 5-methyl-3-vinyloxazolidin-2-one and 2,4-dichlorophenoxyacetic acid A solution of 50 grams 2,4-dichlorophenoxyacetic acid in 250 milliliters ethanol at room temperature was added dropwise, with continuous mixing and stirring to 4,000 grams of aqueous 5 weight percent solution of polymeric 5-methyl-3-vinyloxazolidin-2-one. The polymeric vinyloxazolidinone was of an average molecular weight corresponding to a Fikentscher K-value of 30. As the 2,4-dichlorophenoxy acetic acid solution entered the polymer solution a white gelatinous precipitate was formed. Upon completion of the combination of complectant and complectate, the resulting mixture, which was colloidal in nature, was frozen and cooled to a temperature of minus 30° C. for approximately 24 hours, to break the colloidal dispersion.

The mixture was thereafter warmed to room temperature and filtered, and the white solid filtrate air-dried. As a result of these operations there was obtained an essentially dry polymolecular complex of poly-5-methyl-3-vinyloxazolidin-2-one and 2,4-dichlorophenoxyacetic acid. The aqueous filtrate from which the product was removed contained further portions of the complex, as was evidenced by its distinctly milky appearance. Such portions are removed if desired, by refreezing and refiltering, or by filtration through an ultrafilter. The resulting complex product was found upon analysis, to comprise 28.8 percent by weight 2,4-dichlorophenoxy-acetic acid and 71.2 percent by weight polymeric 5-methyl-3-vinyloxazolidin-2-one, corresponding to an average of 4.3 carbamate units in the complectant per complectate molecule.

The product of the present example was tested for herbicidal activity against numerous species of plants, both monocotyledonous and dicotyledonous and in such tests, was found to be a highly effective herbicide. In a representative operation, the application to an area of land heavily infected with seeds of pigweed (Amaranthus species) of an aqueous dispersion of the present complex product at such rate that the soil area received the equivalent of 5 pounds of the said complex, corresponding to 1.48 pounds of acid complectate, per acre, effected a complete, that is to say, 100 percent, kill of the germinant seeds and emerging seedlings of the pigweed. In an operation similar in all respects except that the test plant was of a common grass weed "foxtail" (*Setaria italica*) there was effected a 100 percent kill of the seeds and emergent seedlings. When the test organism was crabgrass (*Digitaria* spp.) the resulting control of the crabgrass seeds was found to be 98 percent. Similarly, the complex was found to be highly effective in the control of vegetation of numerous other species.

The present complectate is a commercial herbicide of very great importance. Its use has been severely limited, in many applications, by the fact that from most known preparations employing it, sufficient herbicidal vapor escapes to cause injury to sensitive vegetation nearby. Thus, for example, its use near to roses, grapes, cotton, and numerous other desirable ornamental plants is seriously restricted. The escaping vapor can almost always be detected by its distinctive odor. The present complex has the important advantage over the uncomplected herbicidal complectate that the complex has no significant measureable escape of vapor. Thus, the present complex is successfully and safely employed by direct topical application to undesired vegetation growing adjacent sensitive desirable growth.

EXAMPLE 4–B

Complex of polymeric 5-methyl-3-vinyloxazolidin-2-one and phenoxyacetic acid

In procedures essentially the same as those of Example 4–A, foregoing, a complex was prepared employing, as complectant, further portions of the same complectant as in Example 4–A and as complectate, phenoxyacetic acid. The resulting complex was, after simple air-drying, a white, non-hygroscopic, apparently dry, free-flowing powder comprising 80 percent complectant, 17.1 percent complectate, and 2.9 percent water, all by weight of total complex. The said complex was tested for microbiocidal activity in the standard agar cup test method as described hereinbefore, and found to inhibit *Staphylococcus aureus, Salmonella typhosa, Penicillium digitatum,* and *Aspergillus terreus,* at all points with which the said complex came in contact, and for a radial zone of varying distance therefrom, outward. The said complex was practically odorless; and exhibited negligible vapor pressure.

EXAMPLE 4–C

Complex of polymeric 5-methyl-3-vinyloxazolidin-2-one and 2,4,5-trichlorophenoxyacetic acid In procedures essentially the same as those in Example 4–A, there was prepared a complex of polymeric 5-methyl-3-vinyloxazolidin-2-one and 2,4,5-trichlorophenoxyacetic acid. The resulting complex was a white, free-flowing, non-hygroscopic, finely divided solid of approximately 41 weight percent complectate, corresponding to 1 molecule of complectate for each 2.9 carbamate units of polymeric complectant. Confirmation that the said product was a complex rather than a simple mixture or solution in solid phase of the starting materials was confirmed by both vapor pressure studies and infrared spectrum analysis.

The resulting complex product was tested for various biological activities and found to be a herbicide useful to kill seeds, germinant seeds and emergent seedlings, and to kill living plants when employed by foliage application. The complex was found also to inhibit the growth of *Staphylococcus aureus, Salmonella typhosa, Aspergillus terreus,* and *Penicillium digitatum* in a standard agar cup test.

The uncomplected complectate is well known commerically as a herbicide the use of which in many applications is contraindicated because of danger that escaping herbicidal vapors will cause injury to sensitive adjacent desired vegetation. The complex of the instant vapors exhibits negligible vapor pressure. In uses in which the danger of vapor injury contraindicates use of the present complectate, the complex of the present example may often be successfully employed.

Subgenus IV, certain organic sulfur compound complexes

Many organic compounds which may be considered as sulfur-containing acids and their ions, including aromatic, aliphatic, aralyphatic, and heterocyclic sulfate, sulfonate, sulfinate, and similar acids and their ions combine with complectants of the sort described to form complexes of the present invention. The complexes are, in general, chemically stable under ordinary conditions and over a substantial nearby range of temperatures, pressure, and other environmental factors.

A representative sulfur compound complectate is benzene sulfonic acid or its ion. However, other aromatic, araliphatic, aliphatic, and heterocyclic sulfonic or sulfuric acids, xanthic acids and substituted xanthic acids or their ions and sulfinic acids, and for each, the ion also, and the like, are employed with good results.

Illustrative of some of the sulfur-containing acidic compounds which may be employed in the preparation of complexes according to the present invention are: methyl hydrogen sulfate, ethyl hydrogen sulfate, S-monoethyl thiosulfate, propyl hydrogen sulfate, S-monopropyl-thio-sulfate, isopropyl hydrogen sulfate, 1-ethylisopropyl hydrogen sulfate, S-monoisopropyl hydrogen thiosulfate, mono-n-butyl sulfate, mono-sec-butyl sulfate, monoisobutyl sulfate, mono-n-amyl sulfate, mono-iso-amyl sulfate, S-monoisomyl thiosulfate, mono-2-ethylbutyl sulfate, mono-n-octyl sulfate, monoethyl sulfate, monoceryl sulfate, monoallyl sulfate, S-monoallyl thiosulfate, mono (1-allyl)-isobutyl sulfate, mono (1-allyl)-isoamyl sulfate, phenyl sulfate, p-acetylphenyl sulfate, p-nitrophenyl sulfate, 3-methylphenyl sulfate, 2-amino-3-carboxyphenyl sulfate, 2-amino-5-carboxyphenyl sulfate, 2-amino-4-methylphenyl sulfate, 2-amino-4-chlorophenyl sulfate, 6-amino-3-methylphenyl sulfate, 2-amino-1-naphthylphenyl sulfate, 2' - methyl - 4 - dimethylamino - trans - stilbene-3-sulfate, 4-dimethylaminoazobenzene-3-sulfate, dodecyl hydrogen sulfate, hexadecyl hydrogen sulfate, octadecyl hydrogen sulfate, methylsulfonylacetic acid, methanesulfonic acid, ethanesulfonic acid, benzenesulfonic acid, toluenesulfonic acid, benzenedisulfonic acid, 1,2-xylene-4-sulfonic acid, 1,3-xylene-4-sulfonic acid, 1,3-xylene-2-sulfonic acid, 1,4-xylene-2-sulfonic acid, 1,3-xylene-2-sulfonic acid, 1,2,4-pseudocumene-5-sulfonic acid, mesitylene sulfonic acid, cymen sulfonic acid, 1,3,5-benzene trisulfonic acid, toluenedisulfonic acid, mesitylene disulfonic acid, o-chlorobenzene sulfonic acid, m-chlorobenzene sulfonic acid, p-chlorobenzene suufonic acid, o-bromobenzene sulfonic acid, m-bromobenzene sulfonic acid, p-bromobenzene sulfonic acid, m-iodobenzene sulfonic acid, p-iodobenzene slufonic acid, o-nitrobenzene sulfonic acid, m-nitrobenzene sulfonic acid, p-nitrobenzene sulfonic acid, m-nitrosobenzene sulfonic acid, p-sulfanilic acid, 1-aniline-2,4-disulfonic acid, 4'phenyl-amino azobenzene-4-sulfonic acid, benzene thiosulfonic acid, and the like, and the ions as formed by their dissociation in water.

The complexes tend to form quickly and the resulting products are typically somewhat more stable than the complexes of some of the other subgeneric types herein. Some correlation may exist between, on the one hand, the acidity of sulfur-containing organic acid which may be regarded as complectate or parent substances of complectate ions, and on the other hand, the stability of the resulting complex.

Illustrative of complexes of the instant subgeneric group of the present invention are the products of the following examples, which are not to be construed as limiting.

EXAMPLE 5–A

Complex of polymeric 5-methyl-3-vinyloxazolidin-2-one and monomethyl sulfate

In the present example, the complectant is polymeric 5-methyl-3-vinyloxazolidin-2-one characterized by having a K-value according to Fikentscher of approximately 30. The complectant is water soluble. A 1 percent solution heated to temperatures of about 39° C. and somewhat higher, becomes cloudy, indicating a change of solubility probably ascribable to a thermally induced change in geoisometric form. At yet higher temperatures such as 80° C., the solution again becomes clear.

The complectate in the present example is the monomethyl ester of sulfuric acid. The complectate is an oily liquid at ordinary temperatures, which, when heated, decomposes before boiling. It is readily soluble in water.

In carrying out the preparation, 100 milliliters 1 percent aqueous solution of the complectant is gently warmed. At approximately 35° C., turbidity begins to be apparent, and by 39° C., the upper limit temperature in the preparation of the present example, the solution is distinctly cloudy. To the said solution is added 100 milliliters 1 weight percent aqueous solution of the complectate. A water-soluble complex forms immediately, as is evidenced by disappearance of the cloudiness of the complectant alone. The pH of the resulting complex mixture indicates the presence of the acid in an unreacted form, indicating that complecting in the present example does not involve a chemical reaction of the acidic moiety of the complex.

EXAMPLE 5–B

A complex is prepared of which the complectant is polymeric 5-methyl-3-vinyloxazolidin-2-one and the complectate is benzenesulfonic acid. In carrying out the preparation, a 1 weight percent solution of complectant in water is prepared and heated to a temperature of 40°, at which the solution is cloudy. To the cloudy solution is added approximately 1 weight percent benzenesulfonic acid. A complex promptly forms and the solution becomes clear. In the said complex, each benzenesulfonic acid molecule bonds, without conventional chemical reaction, with one of the cyclic carbamate moieties of the complectant. The complex is acidic, and, when isolated, is a solid which, in mass, is glassy and in finely divided form is white; it is readily soluble in water.

From the foregoing general definitions of the complectates to be employed in the instant aspect of the present invention, it will be apparent also that a great many sulfonamides including all benzene sulfonamides and sulfonanilides of which the sulfonamide nitrogen atom carries a hydrogen, come within the present definition and form complexes of the sort described. The ability of such compounds to enter into the instant complexes derives from the sulfonamide moiety, on the aromatic nucleus. Representative complectates include benzene sulfonamide, and benzene sulfonanilide. Other examples of compounds to be employed as complectates in the instant aspect of the present invention include at least o-chlorobenzenesulfonamide,
m-chlorobenzenesulfonamide,
3,5-dichlorobenzenesulfonamide,
3,5-dibromobenzenesulfonamide,
3-iodobenzenesulfonamide,
3,5-diidobenzenesulfonamide,
3-nitrobenzenesulfonamide,
3,5-dinitrobenzenesulfonamide,
o-toluenesulfonamide,
2,4-dimethylbenzenesulfonamide,
o-hydroxybenzenesulfonamide,
o-methoxybenzenesulfonamide,
m-hydroxybenzenesulfonamide,
m-isothiocyanobenzenesulfonamide,
N-methylbenzenesulfonamide,
N-ethylbenzenesulfonamide,
N-$\beta$-bromoethylbenzene sulfonamide,
N-isopropylbenzenesulfonamide,
N-(1-chloropropyl)benzenesulfonamide,
N-acetyl-o-toluenesulfonamide,
N-cyclohexylbenzenesulfonamide,
N-(4-hydroxy-3-nitrophenyl)benzenesulfonamide,
N-(4-acetyl-phenyl)benzenesulfonamide, and other compounds conforming to the foregoing subgeneric definitions, as found in "The Sulfonamides and Allied Compounds," by Northey, No. 106 in the American Chemical Society monograph series (Reinhold, 1948), pages 52–249.

EXAMPLE 5–C

Complex of polymeric 5-methyl-3-vinyl oxazolidin-2-one and sulfaguanidine

Sulfaguanidine in the form of a white crystalline powder is dispersed with continuous stirring into a warm 25 weight percent aqueous complectant solution of polymeric 5-methyl-3-vinyl oxazolidin-2-one in procedures essentially similar to those set forth hereinbefore. The employed amount of complectant is twice that equimolecular with the employed complectant, considering the complectant upon the carbamate moiety basis. During the course of the stirring the complectate disappears in the aqueous dispersion. Upon completion of the addition of complectate, the resulting preparation is dried and ground to obtain a finely subdivided complex of polymeric-5-methyl-3-vinyl oxazolidin-2-one and sulfaguanidine which is established by infrared spectrum analysis to possess a structure distinctively different from that of either starting material, wherein sulfaguanidine moieties are bonded with the complectant of the instant invention. The said complex is readily dispersible as an apparent solution in water.

Closely related to the sulfonamides and sulfonanilides are the organic derivatives of sulfamic acid, and in particular the N-organic-substituted derivatives. The close structural relationship between such compounds and the sulfonamides is at once apparent. The numerous compounds derived from sulfamic acid by introduction of an organic substituent upon the sulfamic nitrogen, wherein the necessary hydrogen or proton remains, form complexes according to the present invention.

EXAMPLE 5–D

Complex of polymeric 5-methyl-3-vinyl oxazolidin-2-one and sulfonated dodecyl monochlorodiphenyloxide In the present example the complectate was a highly refined commercial product prepared by the alkylation of monochlorodiphenyloxide with tetrapropylene (a dodecene) and the subsequent sulfonation of the alkylated product. The product resulting from the preparative processes was a mixture of various isomeric compounds, predominantly a sulfonate of 4-chloro-4'-dodecyldiphenyloxide. The dodecyl groups were predominantly n-dodecyl groups. The complectate may be further characterized in the fact that a 0.1 percent aqueous solution was found to have a surface tension of 31.6 and an interfacial tension against mineral oil of 3.4, both expressed as dynes per centimeter. A saturated aqueous solution contained 2 percent of the said sulfonate, which was soluble in concentrations greater than 5 percent by weight in commercial lubricating oil, kerosene, chloroethylene, methylene chloride, xylene, 1,1,1-trichloroethane, trichloroethylene, toluene, benzene and ethanol. The said sulfonated dodecyl monochlorodiphenyloxide product will, for convenience, hereinafter be identified in this example simply as "the sulfonate."

In preparing the instant sulfonate complex, one kilogram of a 20 percent aqueous sulfonate slurry was prepared, comprising 800 grams water and 200 grams of the sulfonate. To this slurry was added, slowly, and with continuous stirring, 1 kilogram 20 percent aqueous solution polymeric 5-methyl-3-vinyloxazolidin-2-one, comprising 800 grams water and 200 grams of the said polymeric complectant. Stirring at room temperature was thereafter continued for approximately 10 minutes. At the time the complectant substances were combined, the resulting mixture was milky-opaque. After approximately 10 minutes of stirring, the mixture had become completely clear, and comprised 2 kilograms of a 20 percent aqueous solution of a complex of the sulfonate and the said polymeric complectant. The solution was thereafter drum dried to vaporize and remove water and obtain the complex as a yellowish, solid, dry material.

This complex was found to be cleanly water soluble in concentrations at least as high as 50 percent of complex by weight of resulting aqueous solution, corresponding to 25 weight percent of complected sulfonate compound.

The uncomplected sulfonate material is known to have germicidal actions; the availability of this action has hitherto been limited by the solubility of the sulfonate material, which is usually lower than 0.5 percent by weight of water.

An aqueous solution of the present complex is a clear, nearly colorless, strongly germicidal material. The complex is adapted to be included in soaps, detergents, and the like at a rate which is the equivalent of 0.1–0.5 weight percent of the sulfonate in the form of its complex, by weight of soap or detergent.

EXAMPLE 5–E

Double complex of 2,3-dihydro-3-oxobenziso sulfonazole and bis (2-ethylhexyl)ester of sodium sulfosuccinate As is more fully set forth hereinafter, the compound 2,3-dihydro-3-oxobenzisosulfonazole and its salts form complexes according to the present invention. The acceptability of these complexes as non-nutritive sweentening agents is diminished somewhat in some applications by the thermosensitivity of the solubility of the said complex. For example, at concentrations which might ordinarily be employed inthe sweetening of beverages, solutions of a complex of the sulfonazoloxazolidine type alone are clear at temperature up to about 35° C. At temperatures near to this lower limit temperature solutions of the said complex tend to become cloudy representing a change of solubility of the complex without change in its component composition. Although it retains its sweetening power and remains stably dispersed (that is to say no precipitate settles out upon prolonged standing in this form) its appearance is objectionable for many applications. The incipient cloudiness becomes more prominent as the temperature is raised to about 48°, corresponding to a lower limit temperature at which so called "hot" beverages are commonly ingested. At such normal ingestion temperatures the said complex solution achieves a maximum cloudiness, imparting a distinctly hazy appearance to beverages thus sweetened.

Therefore, numerous double-complexes were prepared using the said complectant and, in addition to the said complectate, various surfactant materials which might confer upon the resulting complexes greater dispersibility or solubility in water. Many of the such surfactant materials meet the present definition for sulfur-containing complectate substances. In the present example, the co-complectate was a commercially available surfactant, chemically a mixture which, in water, provided the bis(2-ethylhexyl) sulfosuccinate ion. The sulfosuccinate moiety conforms to the definition of the instant sub-genus of the negative radicals, and complexes readily in the manner of the present invention.

In preparing the present complex, a complex was first prepared consisting of 2,3-dihydro-3-oxobenzisosulfonazole complected with polymeric 5-methyl-3-vinyl oxazolidin -2-one. This preparation and the resulting product are more fully described hereinafter. The complex is a white, water-soluble substance. To a 0.1 weight percent aqueous solution of the said complex was added an aqueous solution of the surfactant in a quantity sufficient to introduce 0.5 percent of sulfosuccinate by weight of the resulting solution. A complex promptly formed without conventional chemical reaction. The resulting product was soluble as a clear solution in aqueous preparations at all temperatures between the freezing point and boiling point of the said preparations.

Complexes of the present invention whereof the complectate was saccharin were prepared and studied in detail. Not only do such complexes represent a valuable and obviously useful embodiment of the present invention, but they establish that the necessary complectate structure is not disturbed by being bonded as a heterocyclic moiety. Thus the present complexes strongly confirm that the electronic structure of certain moieties or portions of the complectate molecule is critical but that the further structure of the complectate is virtually without effect upon the operability of a complectate.

EXAMPLE 5–F

Complex of saccharin and N-ethyl-5-methyl-2-oxazolidinone

To a total of 29 grams of N-ethyl-5-methyl-2-oxazolidinone (a liquid at room temperature) was added 1 gram dry granular 2,3-dihydro-3-oxobenzisosulfonazole compound, commonly known as saccharin. The dispersion was heated gently to a temperature of 60° C. During the heating, the saccharin disappeared as the complex formed. The resulting preparation was then cooled to room temperature, approximately 20° C., and at such temperature remained pellucid. Thereafter, the preparation was chilled to 1° C. to ascertain whether, at such temperature the saccharin would precipitate as a crystalline material. No precipitate formed, but the preparation remained completely clear. The infrared spectrum of the resulting preparation confirmed the identity of the complex of saccharin and N-ethyl-5-methyl-2-oxazolidinone.

In a second preparation, the same procedure is carried out except that the complectant is heated to 125° C. prior to addition of sodium saccharin. The complex is formed quickly as a pellucid liquid which remains clear as the complex is cooled to room temperature.

In yet another preparation, formation of the present complex is carried out at 0° C. At such temperature which is approximately 11.5° above the freezing temperature of the complectant, the complecting action takes place slowly, and stirring and agitation are continued during a period of 24 hours. Formation of the desired complex is indicated by the disappearance, in the said mixture, of the granular saccharin material.

EXAMPLE 5–G

Preparation of a solid complex of saccharin and polymeric-5-methyl-3-vinyl-oxazolidinone One hundred grams of a 10 percent aqueous solution of saccharin was added to 34 grams of a 35 weight percent aqueous solution of polymeric 5-methyl-3-vinyl oxazolidin-2-one having an average molecular weight of approximately 150,000. The resulting mixture was thoroughly stirred at room temperature for a few minutes to obtain a clear aqueous solution of the complex of polymeric 5-methyl-3-vinyl oxazolidin-2-one with saccharin. The solution was drum-dried to obtain a white, solid, non-crystalline complex product. This product was readily soluble in water and was adapted to be used as a non-nutritive sweetening agent.

In one experimental procedure saccharin complex was prepared and air-dried. The complex was a white powder which was found, upon analysis, to comprise 32 weight percent of saccharin complexed with 62 weight percent of the polymeric material and comprising, in the apparently dry form, 6 weight percent of water. In contrast to saccharin alone, the complex was found to be sweet without bitterness or objectionable after-taste, and adapted to sweeten carbonated soft drinks or fruits. In either cold or hot water or aqueous preparations, the said product was sufficiently soluble to impart any desired sweetness of taste.

EXAMPLE 5-H

The present example is carried out as was Example 5-G except that, in preparing the complex, there is employed 10 milliliters of one weight percent aqueous N-cyclohexyl sulfamate, 10 grams of a 35 weight percent aqueous solution of polymeric 5-methyl-3-vinyl oxazolidin-2-one. The resulting aqueous complex solution is drum dried and reduced to a fine powder to obtain a fine complex of polymeric 5-methyl-3-vinyl-oxazolidin-2-one and N-cyclohexyl sulfamate as a highly water-soluble powder having a distinctive and pleasant sweet taste.

EXAMPLE 5-I

Complex of saccharin with polymeric 3-vinyl 6-methyl oxazinidin-2-one

The present example is carried out in all respects as was Example 5-G except that, as complectant, the present example employs polymeric 3-vinyl-6-methyl oxazinidin-2-one. The resulting product is found to be a white, non-crystalline solid readily soluble in hot aqueous preparations.

EXAMPLE 5-J

The present example is carried out as was Example 5-G except that, in preparing the complex, there is employed 10 milliliters of 1 weight percent aqueous N-cyclohexyl sulfamate, 10 grams of a 35 weight percent aqueous solution of polymeric 5-methyl-3-vinyloxazolidin-2-one and, in an acidification step, 0.6 milliliter normal sulfuric acid. The washed and air-dried product is a white, granular, unsatisfied complex product readily soluble in aqueous preparations, having a noticeably acid flavour, and a sweetness per unit weight of the same general order as sucrose.

EXAMPLE 5-K

Complex of saccharin with a copolymer of 5-dimethyl-3-vinyloxazolidin-2-one and styrene The present complectant is a copolymer made from 15 molar proportions of styrene and 85 molar proportions of 5-methyl-3-vinyloxazolidin-2-one. The complectant is a white, finely divided, granular material readily soluble in ethanol. The average molecular weight of the polymer, for each cyclic carbamate unit present, is 123.6.

A dry mixture containing 124 grams of the said copolymer of 5-methyl-3-vinyloxazolidin-2-one with styrene and 103 grams (½mole) saccharin is added with mixing and stirring to 500 milliliters of warm 95 percent ethanol. These solids promptly dissolve and disappear in the ethanol with the resulting formation of the desired complex. Formation of the complex is indicated by, among other things, an ultra-violet fluorescence spectrum different from the combined fluorescence spectra of the starting materials, and the fact that freezing point depression studies indicate dispersion in the ethanol of a number of particles corresponding approximately to the expected number of complectant molecules but not so great as the number of carbamate moieties thereof or correspondingly, the number of complectate molecules.

EXAMPLE 5-L

Artificially sweetened alcoholic cordial

A flavoring essence derived primarily from seeds, stems, and roots of umbelliferous plants, principally amise (*Pimpinella anisum*) and dill (*Anethum graveolens*) together with minor amounts of oil of coriander (*Coriandrum sativum*) and stem and root of angelicia (*Angelica archangelica*) is combined with a syrup containing a sweetening syrup of which the sweet flavor is derived from a complex of saccharin and polymeric 3-vinyl-5-methyloxazolidin-2-one, slightly thickened with gum acacia. The resultant intensely sweet highly flavored concentrate syrup is diluted with alcohol and water and thereafter artificially colored by the addition of small amounts of soluble chlorophyll to obtain an artificially sweetened, sugar-free herb-flavored alcoholic cordial. The water and alcohol are added in such amounts as to provide a cordial containing alcohol in the amount of approximately 30 percent by weight of alcohol-water mixture.

EXAMPLE 5-M

Complex of saccharin and a terpolymer of vinyl acetate N-vinylpyrrolidinone and 5-lauryl-3-vinyloxazolidin-2-one In the present complex, the complectant is a polymer comprising three different monomeric moieties, derived from, respectively, vinyl acetate, N-vinylpyrrolidinone, and 5 - lauryl - 3-vinyloxazolidin-2-one. The monomeric moieties are present in the ratio, approximately, of 5 molar proportions of the oxazolidinone, 4 molar proportions of the pyrrolidinone, and 1 molar proportion of the vinyl acetate in each ten molar proportions of monomeric moieties. The said terpolymer has a molecular weight of approximately 100,000, and is relatively dispersible in a wide range of solvents including water, lower alkanols, oils, fats, and such known organic solvents as acetone and other lower alkyl ketones, benzene, toluene, and the like. The terpolymer is a waxy solid at ordinary room temperatures.

To an aqueous solution containing 2.5 grams of sodium saccharin in 100 milliliters water is added 20 grams of the said polymer of vinyl acetate, N-vinylpyrrolidinone, and 5 - lauryl - 3 - vinyloxazolidin - 2 - one. The resulting complection mixture is confined in a closed vessel and mechanically rocked for a period of 24 hours, to help to carry the complection to completion. Thereafter, the resulting mixture is drum-dried to obtain an unsatisfied complex of saccharin and said terpolymer. The complex is a non-crystalline white solid, physically somewhat more firm than the complectant alone, of limited solubility in water.

The complexes comprising 2,3-dihydro-3-oxobenzisosulfonazole (saccharin) and N-cyclohexyl sulfamic acid or their ionic forms are useful in various applications in which sweetening agents, and in particular non-nutritive sweetening agents are known to be useful. They may be employed as sweetening agents in beverages. The solubility of such complex may be controlled primarily according to the structure and solubility of the complectant. The sweetness of either the complex or the preparation in which it is employed may be controlled by the amount of complex employed and he degree of satisfaction thereof as well as the identity of the complectate. The complexes may be employed as appetitive agents in livestock feeds, therein replacing such known but fermentation-prone sweetening agents as sucrose, molasses, and the like; the complexes may be employed as satients to reduce the feeling of hunger or appetite without contributing nutriment; they may be used as masking agents for unpleasant flavors and in a great many other ways known of sweetening agents generally. The unsatisfied such complexes may be further co-complexed with other complectates having desired properties, to obtain bodying, flavoring, medicating, and like effects.

Subgenus V which includes complexes with N- non-aromatic Nitrogen containing compounds The present subgenus comprises complexes according to the present invention whereof the complectant is a compound of the sort hereinbefore described, and a complectate is an organic compound other than the complectant, also as hereinbefore described, containing a trivalent nitrogen atom.

Complectates of the present subgenus include such compounds as 2,2,4-trichlorobutyramide, n-butyrolactam, 2,4-dicyano-3,3-dimethyl glutarimide, actidione, parabanic acid, uric acid, biuret, 2,4-dithiobiuret, acetylsulfamic acid and its sodium salt, sulfanilylacetamide and 1-acetylthiourea. Also a great many urea derivatives such as the various N-monoalkyl ureas, allantoin, and the like form the present complexes.

Certain of the complectate substances of the instant subgenus are set forth in U.S. Pat. 2,108,887. Other such compounds are to be found in "An Outline of Organic Nitrogen Compounds" (Ypsilanti, Mich. 1945), by Degering, see especially chapters 25, 26, 27: also "Nitrogen System of Compounds" (New York, 1935), by Franklin: also the Journal of The American Chemical Society, volume 62, page 3273 and following (1940): also Chemical & Engineering News, volume 26, page 2686 (September 13, 1948), and also Chemical Reviews, volume 26 (1940), page 496 following.

The intended structures having thus been exemplified, in view of the generic formulas hereinbefore, skilled chemists will readily be able to identify other compounds comprehended within the said definitions.

The complexes of the instant subgenus of the present invention will be better understood by referenec to the following examples which represent only a small part of the experimental work carried out, and intended solely to be illustrative but not to define the scope of the present invention.

EXAMPLE 6-A

Complex-of polymeric 5-methyl-3-vinyloxazolidin-2-one and phenobarbital

The complectate in the present example is comprehended under the defined group of nitrogen-containing compounds which readily form complexes according to the present invention. Infrared spectrum studies of numerous complexes of barbituric acid derivatives lead to the belief that, in the present complexes, bonding arises between the complectant and the imino nitrogen atom of the barbituric acid molecule. Various derivatives of barbituric acid, notably those prepared by substitutions upon the carbon atom which is in position 5 of the ring, are, under the said definition, operable. The present complectate may be known by either its trivial name phenobarbital or by the systematic name 5-ethyl-5-phenylbarbituric acid. The complectate compound melts at 173° C. to 178°C.

In the present example, 17.4 grams phenobarbital were gradually heated to the melting temperature to obtain a clear, colorless liquid. To the molten complectate, 14 grams polymeric 5-methyl-3-vinyloxazolidin-2-one were added, gradually, portionwise, and with stirring. During the addition, an undertermined minor amount of complectate was inadvertently spilled and thus lost to the ensuing procedures. The complectant dissolved promptly in the molten complectate. Upon completion of the combination of the said materials, there remained a clear, colorless, very viscous liquid. The material was allowed to cool spontaneously to room temperature, during the course of which cooling it gradually solidified to a glassy solid. This solid was thereafter broken into lumps and finely pulverized and portions of it tested and analyzed. The resulting complex was found to contain 59.2 percent carbon, 5.83 percent hydrogen and 11.05 percent nitrogen, all parts by weight of total complex. The complex comprised 41 percent hpenobarbital and 59 percent polymeric 5-methyl-3-vinyl-oxazolidin-2-one, both by weight of total complex.

Phenobarital is well known and highly regarded as a sedative and hypnotic. However, despite its numerous beneficial properties in such use, its administration has at times been handicapped because of its poor solubility in water. In the attempt to overcome this problem of solubility, alcoholic vehicles have been used, the sodium salt of the parent substance has been employed and numerous other results have been tried. None has been completely satisfactory. At times, the inclusive of alcohol in the preparation has been contraindicated by reason of its solvent activity in the body, or the biological activity of the alcohol; the alkali metal salts have been available only when neutral or alkali media have been acceptable, and when the alkali metal ion has not been contraindicated. (See the Dispensatory of the United States of America, 25th edition, page 1034.) The present complex has the advantage of being very soluble in water. Moreover, when produced as an unsatisfied complex wherewith other complectable substances may be joined in the manner taught in the present specification, phenobarbital is not only rendered available as a hypnotic and sedative in soluble form, but also in a form wherein it may be combined securely with other substances such as flavoring agents, circulatory system adjuvants, for example vasoconstrictors such as adrenalin, and other medicaments, many of which also form complexes according to the present invention.

By the judicious choice of a complectant, it is readily possible to prepare a complex exhibiting solubility or dispersibility in virtually any menstruum enjoying general pharmaceutical application. The present phenobarbital complexes, however, exhibit the hypnotic and sedative properties of the uncomplected complectate to approximately the same degree as the equivalent weight of uncomplected complectate taken alone.

A complex similar to the foregoing was prepared employing barbituric acid as complectate. The said complex was much more soluble in water than was the uncomplected complectate.

Various alkaloids admit of numerous ingenious separations by the formation of complexes according to the present invention. Thus, for example, the caffeine molecule fails to meet any of the necessary definitions for a complectate of the present subgenus. In contrast, theobromine is operable as a complectate according to the present invention and, accordingly, may be separated from caffeine in mixed solutions of the two by judicious choices of complectant for the intended solvent, and corollary formation of an insoluble theobromine complex. It will be apparent that numerous other isolations, sparations, and purifications are made available by the present invention.

Subgenus VI which includes complexes with
N-aromatic nitrogen containing compounds The present subgenus comprises complexes according to the present invention whereof the complectant is a compound of the sort hereinbefore described and a complectate is characterized as an organic compound other than the complectant consisting of a trivalent nitrogen atom to which is bonded an aromatic radical and hydrogen or an electron. One simple such complectate substance is aniline. Compounds have been found to be operable in which there is a divalent radical one valence of which was bonded to the nitrogen atom, the other valence of which was bonded to the said aromatic ring, giving rise to a polycyclic compound which may be a heterocyclic compound, meeting the definition of said substituents.

Compounds representative of those which are operative as complectates according to the present aspect of the instant invention include phenothiazine, hippuric acid, isatin, p-aminosalicylic acid, and such aniline derivatives as neither replace the imino hydrogen (except by an electron) nor destroy the aromatic ring, (for example N-methyl-aniline, 2,4-dimethyl-aniline, 3,4-dichloroaniline, halogenated salicylanilides such as 4',5-dihalosalicylanilides, for example 4',5-dibromosalicylanilides; 3,5-dihalosalicylanilides such as 3,5-dibromosalicylanilide; 3,4',5-trihalo-salicylanilides such as 3,4',5-tribromo-salicylanilide and 3,4',5-trichlorosalicylanilide; also 3',4',5-trichlorosalicylanilides and its halogen analogues, 3,5,3',4'-tetrachloro salicylanilide and its halogen analogues and the halogen-position isomers thereof; and compounds containing heterocyclic aromatic rings meeting the definition hereinbefore stated.

The present complexes are, in general, chemically stable under usual human living conditions and over a substantial range of temperatures, pressures, and other environmental factors near to such conditions. The complexes tend to have many of the chemical and particularly the biochemical properties of the corresponding uncomplected nitrogen-containing aromatic compounds; and their physical properties and normal physical states tend to resemble those of the uncomplected complectants.

The following examples are selected as illustrative, but not limiting of the present subgenus.

EXAMPLE 7-A

Complex of polymeric 5-methyl-3-vinyl-oxazolidin-2-one and aniline

In a first preparation, aniline was warmed to approximately 40° C. (The temperature is not critical, but preferably the complectate should be liquid.) To the warmed aniline was added an amount of polymeric 5-methyl-3-vinyloxazolidin-2-one substantially less than equimolecular, upon a cyclic carbamate moiety basis, with the aniline. A solid precipitate formed in the warm aniline, and was removed therefrom by filtration. The precipitate was closely examined and found to be a complex of aniline with the oxazolidinone complectant. The complex was an odorless white powder which was of very low solubility in water.

In a second preparation, the said complectant was dissolved in water and the complectate added thereto, with stirring. During the course of the addition of the complectate, a solid precipitate formed in the resulting mixture. The precipitate was removed and examined and found to be a complex of the said starting materials. The properties of the complex resulting from either method of preparation were essentially the same.

The present complex is useful in most of the chemical reactions in which aniline is useful; it has the advantage over uncombined aniline of being a solid and therefore being more easily packaged, stored, and manipulated in various procedures.

EXAMPLE 7-B

Complex of polymerics 5-methyl-3-vinyloxazolidin-2-one and 3,4,4'-trichlorocarbanilide A solution of 10 grams 3,4,4'-trichlorocarbanilide dissolved in 50 milliliters dimethylformamide was added dropwise, slowly, and with vigorous stirring to a solution of 50 grams polymeric 5-methyl-3-vinyloxazolidin-2-one having a Fikentscher K-value of about 30, dissolved in 950 grams water. During the course of the addition of the complectate, a precipitate formed in the resulting solution and, but for the stirring, would have settled therein. Upon completion of the addition, the resulting preparation was filtered and 28 grams of a solid finely divided white complex product was obtained. This complex was found, upon analysis, to comprise 32.5 percent 3,4,4'-trichlorocarbanilide and 67.5 percent polymeric 5-methyl-3-vinyloxazolidin-2-one both by weight of total complex.

EXAMPLE 7-C

Complex of polymeric 5-methyl-3-vinyloxazolidin-2-one and 3,4,4'-trichlorocarbanilide In the present example the starting complectant and complectate, and the resulting complex are essentially the same as in the foregoing example; the complex is prepared by a different method.

Ten grams 3,4,4'-trichlorocarbanilide is dissolved in 50 milliliters dimethylformamide. 25 grams polymeric 5-methyl-3-vinyloxazolidin-2-one is dissolved in 200 milliliters dimethylformamide. Each is a colorless transparent solution. The said solutions are then combined and mixed intimately together to form the desired complex. The resulting complex solution in dimethylformamide is added to approximately 1.3 liters water. The dimethylformamide solvent, together with complectant not bound in the complex, disperse and are dissolved in the water whereas most of the complex precipitates. The resulting aqueous dispersion is filtered, and the recovered residue comprises a complex of 3,4,4'-trichlorocarbanilide and polymeric 5-methyl-3-vinyloxazolidin-2-one, useful as a germicide, and characterized by having antiredeposition properties and also water solubility much greater than that of the uncomplected carbanilide compound. The complex is therefore adapted better than the complectate to employment as a soap germicide.

EXAMPLE 7-D

Complex of polymeric-5-methyl-3-vinyloxazolidin-2-one and thiocarbanilide

In the present example, the complectate was thiocarbanilide and the complectant was polymeric-5-methyl-3-vinyloxazolidin-2-one having a K-value according to Fikentscher of approximately 30.

The present complectate is known to be desirable as a flotation agent in the separation of ores such as galena from agitated slurries, for example foamed slurries, in which such ores appear together with impurities such as pyrites, from which it is desired to separate the commercially valuable one. While theoretical explanation remains incomplete, it is known that certain substances cause the desired ore to float free of the impurity. In such use, thiocarbanilide has been severly limited by the fact that the compound is of extremely low solubility in water. For example, at room temperature, which is near to the temperatures encountered in commercial ore flotation, thiocarbanilide is soluble in water to the extent of approximately 4 parts per million, an amount insufficient to effect the desired flotation of metallic ores. Numerous preparations such as wettable dispersions and solutions in organic solvents have been used in the attempt to adapt thiocarbanilide to the separation of ores from slurries. The present complex was prepared to ascertain whether the said complex would be sufficiently more soluble than the uncomplected complectate to adapt it to the said application and perhaps to other applications.

In preparing the instant complex, a weighed amount of thiocarbanilide was heated to melt it. Thiocarbanilide melts at 151° C. To the melted thiocarbanilide was added an amount of polymeric - 5 - methl - 3 - vinyloxazolidin-2-one equivalent with the thiocarbanilide upon the basis of cyclic carbamate moieties in the said polymer. The polymer promptly dissolved in the melted thiocarbanilide giving rise to a colorless molten product which was thereafter cooled. During cooling, the complex increased in viscosity gradually until it eventually solidified but did not exhibit a sharp freezing temperature. The resulting product was a glassy solid which was broken into lumps and then finely ground to obtain a white powdered material. The resulting complex was found to be soluble at a rate of 127 parts per million parts of ultimate aqueous solution; of the said complex, approximately two thirds by weight is thiocarbanilide, indicating that the complex is capable of introducing complexed thiocarbanilide into aqueous solution in ultimate concentrations approximately 30 times as great as when the uncomplected thiocarbanilide is employed. The resulting thiocarbanilide complex and its solutions are useful as flotation agents in the separation of certain metallic ores by flotation from slurries thereof.

EXAMPLE 7-E

Mercaptobenzothiazole complex and product prepared with it

Mercaptobenzothiazole is known as a curing agent in the processing of rubber. In such use it has suffered the disadvantage that rubber products so cured often acquire and exhibit a very unpleasant odor.

A complex of mercaptobenzothiazole and polymeric 5 - methyl - 3 - vinyloxazolidin - 2 - one was prepared according to procedures hereinbefore fully set forth. The resulting complex was a white finely divided material the identity of which as a complex was clearly established by the marked suppression of vapor pressure and odor as compared with the uncomplected mercaptobenzothiazole and also by infrared spectrum.

The resulting complex was employed in known procedures in the curing of rubber.

The employed crude rubber was of the type known in the trade as a "SBR" rubber, that is to say, a styrene-butadiene rubber of which the monomeric composition was 23 percent bound styrene, 77 percent butadiene, and upon the basis of the total monomer content, 25 percent naphthenic oils. The crude rubber before curing had a Mooney viscosity of 50 to 65.

The complex was employed in an amount whereof the complectate content corresponded to the desired quantity of mercaptobenzothiazole. The said complex was found to be completely satisfactory as an agent in the curing of rubber and to have the advantage that the rubber so-cured was practically free from the undesirable odor usually characteristic of rubbers cured with mercaptobenzothiazole. The persistent suppression of the said odor indicates that, through the curing process and in the finished rubber, the mercaptobenzothiazole persisted stably as a complex.

Trifunctional complectate with aromatic amino, carboxyl, and hydroxyl groups

A complex of the present invention was prepared in which the complectate was the compound p-amino salicylic acid. This compound exhibits three kinds of groups each of which is capable of bonding with the present complectants to form the present complexes. In the complexing action, the hydroxyl group and the carboxyl group tend to be about equally active, apparently somewhat more active than the amino group in the present complectate, although all three groups clearly evidence capacity to be bonded simultaneously in the present complex, if sufficient complectant be supplied.

The resulting complexes possess numerous of the desirable and useful properties of the uncomplected complectate, but numerous differences which, in many applications, are advantageous. For instance, some of the complexes are more effective than the complectate in inhibition of the growth of pathogenic bacteria.

EXAMPLE 7

Complex of 4-amino salicylic acid and polymeric 5-methyl-3-vinyloxazolidin-2-one A solution of 25 grams 4-aminosalicylic acid was dissolved in 125 grams alcohol at room temperature, and the resulting solution added dropwise, with stirring, to 2,000 grams 5 weight percent aqueous solution of polymeric 5 - methyl - 3 - vinyloxazolidin - 2 - one having a K-value according to Fikentscher of approximately 30. With the addition of each drop of the complectate solution, a white precipitate was noted to be formed and maintained in suspension by stirring. Upon completion of the addition of the complectate, the resulting solution was filtered whereupon there was obtained 106 grams of a white complex precipitate. This precipitate was found, upon analysis, to contain 53.44 percent carbon, 6.76 percent hydrogen, 9.80 percent nitrogen, and 2.44 percent amino ($NH_2$). This analysis corresponds to a complex composition of 72.4 percent by weight of complectant, 23.3 percent by weight of complectate and 4.3 percent water. The 106 gram yield of product with this analysis corresponded to 99 weight percent of the starting complectate. The resulting complex comprises 1 molecule of complectate per each approximately 3.7 cyclic carbamate units in the polymeric cyclic carbamate complectant. The carboxyl, hydroxyl, and amino groups were bonded with the complectant. In this regard it is noted that a theoretically satisfied complex of the said starting materials would comprise one molecule of complectate for each 3 monomeric units of complectant.

This complex was tested for bacteriostatic action in a standard agar cup test. In such test, the performance of the said complex was compared with the performance of the uncomplected complectate. Neither the uncomplected acid nor the complex exhibited fungi-static action against the fungi *Penicillium digitatum* or *Aspergillus terreus* whereas the uncomplected acid exhibited a zone of inwhereas both showed bacterio-static action. However, hibition of 1 millimeter radius surrounding the agar cup area, the complex according to present invention was apparently two to three times as mobile; it caused complete inhibition over zones of 2 millimeters and 3 millimeters radius, respectively, due to the improved solubility and ease of diffusion evidenced by the complex.

GENERAL METHODS OF PREPARATION

It will be apparent from the foregoing teaching, that the complexes according to the present invention are prepared in various preparative procedures. In any of the procedures, amounts which are stoichiometric with respect to the formation of the present complexes, or any desired fraction or multiple thereof, may be calculated in simple procedures applicable in known methods. In general, the assumption is first made that each complectable site of the sort hereinbefore described of each complectate molecule is capable of bonding with one cyclic carbamate moiety of the complectant. Amount of complectant to be employed, then, is calculated upon the basis of molality of the functional cyclic carbamate groups present in such complectant.

Complectant and complectate may be combined in one or a combination of more than one of at least eleven processes for the preparation of the present complexes.

In a first such process which is useful when the complectate melts without injury, the complectate is melted, and the desired amount of cyclic carbamate complectant is dispersed in the melted complectate with stirring. Upon completion of the combination of the complectant and complectate and the intimate dispersion of each in the other by mixing, the resulting preparation is allowed to cool. Upon cooling, such preparation usually increases in viscosity until the material becomes essentially solid. In cooling, the complex product does not usually exhibit a sharp melting temperature. This method is limited in that it is desirable to be employed only in the instance of those complectates which without damage melt at temperatures not much higher than about 200° C. When employed with complectates which melt only when heated at temperatures substantially higher than 200° C., the employment of this method may result in a least yellowing and incipient decomposition of complectant, and may result in general degradative pyrolysis thereof. This method is advantageous in the preparation of complexes with all complectates which are normally stable at a melting temperature not much above 200° C. When the molecular weight of complectate and of cyclic carbamate unit in total complectant are known, the employment of this method may be controlled with great precision to obtain complexes of desired composition, including the degree or proportion of uncomplected complectate, or the desired degree of satisfaction or departure therefrom of complectant. In view of this precise control, purification is usually unnecessary. However, when desired, purification may be effected as by selective extraction with solvents, and the like.

The product obtained from this method is usually a vitreous solid. Such solid may be formed by cooling in a vessel or mold which may be the vessel in which it was prepared, and thereafter employed as such vitreous solid, in cast or formed shapes including useful shapes of desired articles, if desired; or may be removed and broken and thereafter sub-divided to any desired degree of fineness as in a ball-mill or the like.

A second general process available to be employed in preparation of the present complexes involves the use of volatile solvent, such as an aliphatic liquid, for complectant and complectate. Amounts of complectant and complectate to be employed are calculated in the manner set forth hereinbefore. Complectant and complectate are separately dissolved in any desired amount of solvent, conveniently the smallest quantity which will effect complete solution. The resulting separate solutions are combined with stirring, and solvent is thereafter removed by evaporation, from the resulting mixed solution. The resulting solid from such evaporation comprises the present complex in the degree of satisfaction resulting from the employed quantities of starting materials.

In a third process complectant and complectate are both dissolved in dimethylformamide or other water dispersible mutual solvent. The complex forms with the materials in solution and, in most instances, the complex remains in solution. Thereafter, the complex solution is poured into or mixed with a relatively large volume of water in which the solvent, for example dimethylformamide, disperses whereupon if water-insoluble complex be present, it precipitates in the aqueous dispersion. This method has the advantage that it is readily adapted to laboratory procedures to determine whether a candidate compound will form complexes. In practicing this method it should be remembered that not all the complexes thus prepared precipitate in water, and not all precipitates are complexes. For example, when a complex precipitates in the indicated manner, a complex of the same components but in different proportional composition may remain in solution. Such complexes may usually be removed by evaporation of solvent. A precipitate of which the nature is uncertain may be examined in methods some of which are known to chemists, some of which are set forth hereinbefore, to determine whether a complex was formed.

In a fourth process, the complectate may be dissolved in a water-miscible solvent such as ethanol, dimethylformamide, acetone and the like and this solution may be slowly dropped into an aqueous solution of complectant. When the complexing action results in formation of an insoluble complex, such complex precipitates, and may thereafter be recovered in conventional ways. This method has the advantage of being adapted to determine readily whether a complex is formed, assuming such complex to be water-insoluble; in which instance, it is readily adapted to determine the maximum amount of complectant which can be bound in water-insoluble form by complectate. For such use, a five- to ten-fold excess of complectant in aqueous solution is usually convenient. The method is limited in that it depends upon the water solubility of the complectant, the water dispersibility of the complectate solvent, and the insolubility of the resulting complex.

In a fifth process, available when complectant and complectate are both water-soluble, aqueous solutions of complectant and complectate may be mixed and a precipitate, if any is formed, examined to determine whether it comprises a complex. The complex may be soluble and a precipitate may be some extraneous matter. This method is advantageous in the preparation of complexes insoluble in water; it makes use of an inexpensive solvent.

In a sixth process, when the appropriate solubility is evident, complectant and complectate may be dissolved in an inert benzene-miscible solvent and thereafter the resulting mixture poured into excess benzene wherein, in many instances, a complex according to the present invention will precipitate. An advantage of this method is its adaptability to employment with substances which readily hydrolyze in water, for example, certain ester complexes. This method is particularly adapted to complexes of which the water-solubility renders former methods inapplicable.

Seventhyl, when a complectate is to be employed of which a salt is water-soluble, and wherein the complectant is water-soluble also, such complectate salt may be employed in aqueous solution and mixed with aqueous compectant. The resulting usually colorless and clear solution may be acidified whereupon, depending upon the properties of the materials involved either the complex or the complectate or both may precipitate and such precipitate, if any, may readily be shown to be a complex. Alternatively, the aqueous complex dispersion may be employed.

Eighthly, when it is desired to prepare a complex whereof the complectate is a salt as defined in the seventh method, above, the said salt may be dissolved in water and the undiluted complectant added thereto. The resulting product may be dried in known procedures and thus freed of water solvent and the resulting dry material examined in known ways to determine the formation of a complex.

Ninthly, when either complectant or complectate or preferably both are solids, irrespective of solubility, a complex may be formed by mutual pressure as milling the substances together, as for example, between corotating contacting usually horizontal rollers of which one is usually heated and the other chilled, which are provided with means such as a plough, scraper, or blade, for removal from either or both rollers of adhering substance. The mixture is applied to the corotating rollers adjacent the line of mutual contact, upon passage through the bite of which the material becomes compressed into a semisolid, solid, or coherent mass. This is milled and remilled in the described procedure until substantial equilibrium has been achieved; whereupon the resulting material is removed by plowing, scraping, or in other ways and the removed material returned repeatedly to the rollers. This may be carried out by automatic machinery or by hand, for such period of time as may be desired and such exposure to roller temperatures as may be advantageous to prepare a complex according to the present invention. If desired, both rollers may be heated or, conversely, both rollers may be chilled. This method has the advantages of requiring no solvent, and of being adapted to the complexing of substances from which the removal of solvent would be difficult. It should be pointed out that complete fusion of either or both starting materials is not necessary for the successful operation of this method.

The tenth method may be regarded as an employment of the same general principles as are embodied in the ninth. In the practice of the present method, complectant and complectate in desired amounts calculated in the manner hereinbefore set forth, are combined in the dry form and are thereafter intimately brought together as by co-milling or compression molding in any of the various procedures known in laboratory and industrial practice for the intimate contacting together of finely divided solids. Examples of such contacting are to be found in hammer-milling, ball-milling, dry stirring, air-borne or partially air-borne cyclone agitation, tabletting, extruding, and the like. In general, time required for completion of complection under non-liquid conditions is somewhat longer than time required in the liquid states. If desired, samples may be removed from the mixture and examined, as by infrared spectroscopy or the like, to ascertain progress of the process of complection. While no theoretical postulate is to be regarded as limiting the known scope of the instant invention, it is pointed out that at least the polymeric present solid complectants are theorized to be super-cooled liquids. As is known of such substances, supercooled liquids readily deform or cold-flow under pressure, which may be impact pressure, so that under the non-liquid conditions of the present procedure, at the molecular level the contacting which takes place may be regarded as involving solid-liquid contact.

While no particular procedural steps are indicated, an eleventh procedure may be set down as the preparation, in situ, of a complex in procedures hereinbefore set forth when it is desired to employ such complex in, for example, a defined space. Illustrative of such in situ preparation, is the application, as a preservative to cellulosic material which may be wood, of pentachlorophenol. Either before or subsequent to introduction of pentachlorophenol into the site where preservative action is desired, a complectant according to the present invention may be introduced thereinto and, in situ, form the present complex, thereby giving rise, in the resulting complex prepared in situ, to the advantages and benefits to be enjoyed from employment of the present complexes. Chief among such advantages is that of permanence of the protection arising from the negligible volatility, low solubility, and high viscosity of the complex. Among the embodiments of the present invention is the employment of the methods, in the preparation of the complexes of the present invention, for any of the related purposes of chemical analysis, chemical isolation, separation, purification, or rejection of impurity. The methods by which such procedures are to be carried out are believed to be apparent from the foregoing teaching. In view of such teaching it is sufficient here to note that complectant substances may be selected with regard to their solubility in liquids necessarily present, their mechanical strength if desired, their adaptability to the formation of shaped articles thereof, and other properties. When brought into contact which is preferably fluid contact with an organic complectate according to the present invention, there are formed at the points of such contact complexes according to the present invention. Such complexes form only with substances capable of forming the present complexes; in general, complectate substances of the sort hereinbefore defined. Thus, for example, when a solution containing both estrogenic and androgenic hormones is passed through a column of a present complectant in a form which is both insoluble as to liquids present and is so disposed as to afford large surface contact area per unit weight, the estrogens (which contain an aromatic group connected to a chalkogen which chalkogen is further connected to an anion) form the present complexes and are bound in insoluble form. In contrast, the androgens which do not contain such structure readily pass through unaffected. As has hereinbefore been noted, application of a suitable solvent thereafter serves to elute the complectate.

It is to be understood that the present hormone substances have been named in this process for purposes of illustration only and that the adaptability of the present invention to such processes is limited only by the full scope of the invention.

METHODS OF TESTING FOR COMPLEX FORMATION

It has been pointed out that compounds possessing complectate groups of certain types will bond with the present complectants to form complexes according to the present invention. It may be desirable to demonstrate formation of such complex. Tests which demonstrate formation of the present complexes may be used also to determine whether a candidate complectate outside the present difinitions will or will not form a complex, and to distinguish such complex from a simple mutual solution or product of chemical reaction. Skilled chemists will encounter no unusual difficulty in demonstrating existence of complexes of the present invention, or in testing mixtures of complectant and complectate candidate substances in known methods to determine whether complexing has taken place. Test methods which have been found useful include the following:

(1) Infrared spectroscopy.—As is well known, the capacity of a substance to transmit the various frequency components of a broad band of infrared radiation varies, selectively, under the influence of certain moieties and groups present in the substance upon a mass of which the radiation impinges. Thus, for example, maxima and minima of transmission at certain frequencies or certain patterns of various frequencies indicate the presence, in the substance through which the spectrum is transmitted, of groups of which such transmission maxima and minima are characteristic. Thus, to a considerable extent, the infrared spectrophotometric curves to be derived from a substance can be predicted from a prior knowledge of its chemical structure. In the instance of a substance of which the spectrum is unknown, or in which the relationship between spectrum and structure is unknown, it is possible to carry out a reference spectrum measurement on a simple whereby to establish a standard applicable to at least material uniform with the sample. It follows, and it is harmonious with observed data, that when a substance is chemically altered, the spectrophotometric curves derived from infrared spectrum analysis are also altered. Commonly, the extent and nature of the chemical change is closely indicated by the change in the infrared spectrum curve. Many of the complexes of the present invention can be shown to be chemically different from either or both starting materials or from a theoretical spectrum representing a mixture thereof by the presence, in such infrared spectrophotometric curves, of departures from the spectra of the starting materials, not ascribable to classical chemical reactions but adequently explained by the concept of shared-electron complexes which may also be called molecular resonance complexes. The levels of energy involved in effecting the observed distortions in the infrared spectra coincide closely with the levels of bonding energy ascribed to the instant complexes upon the basis of measurements in other methods. Thus, in the instances of many of the present complexes, infrared spectrum analysis quickly establishes the fact and somewhat regarding the nature of the complex formation.

(2) The bonding together of compectant and complectate according to the present invention effectively reduces the number of particles (considered at the molecular level) in a solution in which such complection takes place. When the complectant is a polymeric substance to each molecule of which many complectate molecules may be bonded, the formation of a complex according to the present invention may reduce very greatly the number of particles present. Precise determinations of depression of freezing temperature of a solvent by a known amount of a substance to be tested for complection will often indicate a depression of freezing point which conforms to that expected when the smaller number of particles is present when a complex exists; and fails to conform to the expected performance when the larger uncomplected number of the molecules are present in uncombined form. Thus, the application of known cryoscopic methods usefully determines the existence of many of the instant complexes.

(3) Closely related to cryoscopic phenomena is the known effect upon vapor pressure of the number and size of particles of a composition. When precise vapor pressure measurements can readily be made, the contrast between the vapor pressure of a complex and the sum of the vapor pressures of uncomplected substances may often readily be ascertained. This is especially useful when employing a complectate of which the vapor pressure can readily be determined. Complexing according to the present invention has an effect upon the vapor pressure of components of such complex, similar to the effect of chemical condensation; the vapor pressure of the complex is always appreciably lower than the sum of the vapor pressures of the uncomplected components.

(4) Yet another closely related method involves the segregation of components of a dispersion which may be a solution, upon the basis of particle density by means of different rates of sedimentation. Sedimentation may be accelerated, if desired, by such means as the use of an ultracentrifuge. Examination of the fractions separable in such procedure frequently discloses the presence, in the more dense fraction, of particles comprising combined complectant and complectate, which have a specific density higher than the corresponding specific densities of the starting materials.

(5) The spectrum of fluorescent emission excited from the present complexes by incident ultraviolet radiation of wavelength near the wavelengths of the visible spectrum is often significantly different from the added fluorescent spectra excited from the uncombined starting materials under similar influence. Thus, ultraviolet spectroscopic studies may readily demonstrate formation of a complex.

(6) Many of the present complexes are clearly describable upon the basis of solubility behavior. Thus, for example, when complectant and complectate are separately dissolved in separate portions of the same solvent each yielding a limpid solution, upon combination of the two solutions a precipitate may form. The change in solubility from starting materials to resulting product is indicated by such precipitation. This indicates, in turn, the formation of a new substance, presently a complex. Solvents useful in this method include water, ethanol, dimethylformamide, and others. In some instance, a complex of the present invention, when washed with another liquid which is solvent for only one complex component, may yield complectant or complectate separately to such solvent.

(7) Among the other numerous methods available to skilled chemists to demonstrate of complexing according to the present invention are biochemical methods. Quantitative determination of biochemical parameters of complectate substances often permits comparison with similar parameters of the substances suspected of comprising a complex. For instance, particularly when employing the polymeric complectants, which are characteristically bland, biologically inert substances, one of the complexes comprising an antimicrobial substance may often be distinguished from a simple mixture of a present complectant and an antimicrobial substance which does not form a complex according to the present invention by the agar cup test hereinbefore described. (See Example 1–D.) In general, closely similar results are obtained when using the antimicrobial substance alone or in simple mixture with another substance which is biologically inert, such as a candidate complectant substance; whereas, when a complex forms, distinctively different antimicrobial action is observed. When complexing takes place and the resulting complex is more soluble than the uncomplected complectate, the antimicrobial action will commonly be more widely distributed or diffused over a larger zone; when complexing takes place and the resulting complex has lower solubility or lower vapor pressure or both than the uncomplected complectate, then the antimicrobial action is frequently confined to, but may be more intense in a smaller zone. In addition, many complexes according to the present invention are selective in their action upon micro-organisms in ways in which the uncompleted complectates are not. One such phenomenon distinguishes between fungi and bacteria. Complexes of certain antimicrobial substances frequently are germicidal but not fungicidal whereas the uncomplected antimicrobial substance if both germicidal and fungicidal.

It is well known that many liquids when being employed as solvents, form complexes with many solute substances. Thus, for example, many aqueous solutions are, in fact, aqueous dispersions of complexes composed of water and solute. Other solvents of which the same is often true include methylene, dichloride, chloroform, acetic acid, dimethylformamide, and pure, that is to say, 96 percent to 100 percent sulfuric acid. Upon the existence of such complexes have been postulated explanations of such phenomena as azeotropic distillation, cryoscopic phenomena, crystals comprising solvent and crystalloid and the like. The capacity of solvents, and particularly solvents meeting the foregoing criteria for complectates, to form such solvent complexes in some way competes with the capacity of the present complectants to form complexes, with the result that complexes of the present invention may be stable under some conditions such as being dispersed in some solvents while being unstable under other conditions such as being dispersed in other solvents. Thus, for a complex of the present invention to form in solvent when such solvent has a tendency to form a complex with the complectate, the bonding of complectate with the present complectants must be stronger than any tendency of the complectate to form a complex with the solvent. Because both the available solvents and the present complectates are so varied in nature, no general rule for the selection of a suitable solvent can be set forth. It is pointed out, however, that complexes according to the present invention can successfully be prepared in the absence of solvent. Therefore, while it may often be convenient to carry out the preparation of the present complexes in solvent, any problem of solvent sensitivity can be overcome by the simple expedient of preparing the complexes in the absence of solvent, according to methods hereinbefore set forth.

I claim:

1. Product obtained by the process that comprises the step of contacting a polymeric cyclic carbamate of the formula

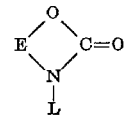

wherein O is the symbol for oxygen, C is the symbol for carbon, N is the symbol for nitrogen, and wherein E represents a divalent moiety selected from ethylene, trimethylene, methylethylene, 1,2-dimethylethylene, 1,3-amylene, 2,3-amylene, 2,4-amylene, 1,2-hexylene, 2,4-hexylene, 2,3-hexylene, 3,4-hexylene; cyclohexyl ethylene, phenylethylene, 1-phenyl-1,3-propylene, 1-phenyl-1,2-propylene, (p-tolyl)ethylene, 2-(o-tolyl)-1,3-trimethylene, L is a group

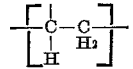

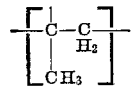

or

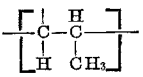

and the said polymers have a Fikentscher K-value of from about 2 to about 200 with a compound of the formula $$Q_n—G—R$$

wherein $n$ represents the total valency with respect to all Q of all the occurrences of G in a given molecule;

Q is, independently in any of its occurrences, hydrogen or the charged proton residue from its ionization;

G represents one of the moieties

—O—, —S— and

R is selected from

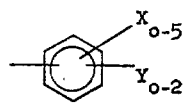

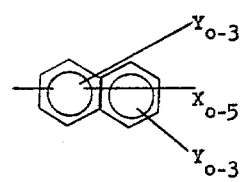

and

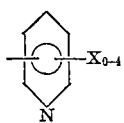

wherein the sum of the occurrences of X and Y in any molecule is less than six, and wherein X is selected from —OH, —Cl, —Br. —I and wherein Y is selected from

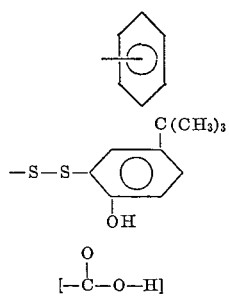

[—NH$_2$]
—NO$_2$
—O—loweralkyl $$-\overset{O}{\underset{\|}{C}}-CH_3$$

—loweralkyl
—CH$_2$—CH=CH$_2$
[—NH—loweralkyl]
—N(loweralkyl)$_2$

References Cited

UNITED STATES PATENTS 2,946,773   7/1960   Walles et al. _____ 260—77.5

OTHER REFERENCES

Drechsel, J. Org. Chem. 22, 849–51 (1957).
Higuchi et al., J. Am. Pharm. Soc., Sci. Ed. 43, 393–401 (1954).

WILLIAM SHORT, Primary Examiner

M. GOLDSTEIN, Assistant Examiner

U.S. Cl. X.R.

260—47, 77.5, 307.3